US005579031A

United States Patent [19]
Liang

[11] Patent Number: 5,579,031
[45] Date of Patent: Nov. 26, 1996

[54] COLOR MATCHING METHOD AND APPARATUS

[75] Inventor: Zhongjie Liang, Sewell, N.J.

[73] Assignee: E. I. Du Pont de Nemours and Company, Wilmington, Del.

[21] Appl. No.: 389,985

[22] Filed: Feb. 14, 1995

Related U.S. Application Data

[63] Continuation of Ser. No. 992,874, Dec. 15, 1992, abandoned.

[51] Int. Cl.$^6$ ..................................................... G09G 5/02
[52] U.S. Cl. ............................................. 345/154; 345/155
[58] Field of Search ............................. 345/150, 152, 345/153, 154, 155; 348/180, 181, 189, 177, 178; 395/131

[56] References Cited

U.S. PATENT DOCUMENTS

| | | | |
|---|---|---|---|
| 4,060,829 | 11/1977 | Sakamoto | 358/80 |
| 4,127,871 | 11/1978 | Sakamoto | 358/80 |
| 4,386,345 | 5/1983 | Narveson et al. | 340/703 |
| 4,409,614 | 10/1983 | Eichler et al. | 328/157 |
| 4,500,919 | 2/1985 | Schreiber | 358/78 |
| 4,670,780 | 6/1987 | McManus et al. | 358/80 |
| 4,706,108 | 11/1987 | Kumagai et al. | 358/10 |
| 4,751,535 | 6/1988 | Myers | 368/520 |
| 4,929,978 | 5/1990 | Kanamori et al. | 358/520 |
| 4,941,038 | 7/1990 | Walowit | 358/80 |
| 4,959,790 | 9/1990 | Morgan | 364/518 |
| 4,970,584 | 11/1990 | Sato et al. | 358/518 |
| 4,992,862 | 2/1991 | Gabor | 358/80 |
| 5,038,300 | 8/1991 | Seiler et al. | 340/703 |
| 5,083,195 | 1/1992 | Evelin | 358/10 |
| 5,227,768 | 7/1993 | Beckett et al. | 340/703 |

FOREIGN PATENT DOCUMENTS

| | | |
|---|---|---|
| 0173032 | 3/1986 | European Pat. Off. . |
| 0475554A2 | 3/1992 | European Pat. Off. . |
| 61-138945 | 6/1986 | Japan ........ 358/527 |
| 0245290 | 9/1989 | Japan ........ 340/701 |
| 0130594 | 5/1990 | Japan ........ 340/701 |
| 92/06557 | 4/1992 | WIPO . |

OTHER PUBLICATIONS

P. Kubelka, "New Contributions to the Optics of Intensely Light Scattering Materials," Part I, Journal of Optical Society of America vol. 38, pp. 448–457.

W. L. Rhodes, "Proposal for an Empirical Approach to Color Reproduction," Color Research and Reproduction, vol. 3, No. 4, Winter 1978, pp. 197–201.

H. E. J. Neugebauer, "Unsolved Problems of Color Reproduction," Technical Association of the Graphic Arts, Tenth Annual Meeting, Jun. 23–26, 1958 pp. 45–56.

D. L. Spooner, "Digital Simulation of Prepress Proofing Systems," SPIE vol. 1184 Neugebauer Memorial Seminar on Color Reproduction, 1989, 131–135.

(List continued on next page.)

*Primary Examiner*—Richard Hjerpe
*Assistant Examiner*—Lun-Yi Lao
*Attorney, Agent, or Firm*—Thomas H. Magee

[57] ABSTRACT

A process and related apparatus for producing at least two matched color displays of a digital image using two different display devices, comprising using an adaptor to convert the digital information representing the image to digital information such that the displayed image as a result of this converted digital information on one of the devices, appears the same as the image displayed on the other to an average observer when viewed under similar viewing conditions. The adaptor contains a transform LUT constructed using display device modeling to generate corresponding values to preselected input digital image values to map the input color values into the color space of the display device so that image matching is achieved. A output value signals received from a first model are compared to output value signals received from a second model to obtain an error signal used to modify the input color values to the second model, and the modified color values are then used to create the transform LUT for matching the color display of the second display device with that of the first device.

12 Claims, 6 Drawing Sheets

OTHER PUBLICATIONS

W. K. Pratt, "Digital Image Processing" Second Edition pp. 60–73.

Berns, R. S. "Colorimetry for Electronic Imaging Systems" 1991 The Munsell Color Science Laboratory, Rochester Institute of Technology Chapter 27 pp. 1–4; Chapter 28 pp. 2–14.

Kang, H. R. and Anderson, P. G., "Neural network applications to the color scanner and printer calibratons," Journal of Electronic Imaging, vol. 1, No. 2, Apr. 1992, pp. 125–135.

Tajima, J., "Optimum Color Masking Matrix Determination for Digital Color Platemaking, Using Virtual Color Samples," Systems and Computers in Japan, vol. 20, No. 7, Jul. 1989, pp. 104–112.

Laihanen, P., "Optimization of Digital Color Reproduction on the Basis of Visual Assessment of Reproduced Images," Proceedings of the SID, vol. 30, No. 3, 1989, pp. 183–190.

Taylor, J., Tabayoyon, A., and Rowell, J., "Device–independent color matching you can buy now," Information Display, vol. 7, No. 4 & 5, 1991, pp. 20–22, 49.

COLOR MATCHING METHOD AND APPARATUS

This is a continuation of application Ser. No. 07/992,874 filed Dec. 15, 1992, now abandoned.

COPYRIGHT NOTICE

A portion Of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to color matching and more particularly to a process and related apparatus for matching the color displayed on a plurality of color display devices.

2. Description of Related Art

The primary use of this invention is in the field of computer assisted color publishing systems particularly in the area of color matching. In such systems typically a color image is scanned using a scanning device which measures light intensity reflected or transmitted from the image to generate electronic signals representing three achromatic images of the original, each of the three achromatic images resulting from detecting the light intensity from the original color image through a colored filter. The filters used are almost always Red, Green and Blue. The electronic signal from the scanner is converted to a digital signal in which light intensity levels are represented as numbers. Information identifying each set of numbers representing the image information obtained through each filter is also preserved. Thus, through these steps, the original colored image is converted to a plurality of image values, and for each picture element in the picture, there are three such values, a Red, a Green and a Blue.

The image represented by the image values may be displayed in a CRT type monitor, or may be printed using a printing device able to accept electronic input. Often the image will be displayed at different locations and times using more than one display device, such as a plurality of CRT displays for observation and study by more than one operator. Similarly, hard copies may be desired in two or more different locations using two or more different printers. Even though the input values to the multiple CRT displays are the same, the displayed colors are vastly different, as anyone is well aware of who has ever observed the multiple television displays in a typical television sales store front. However, when one needs to make decisions about acceptability of color for a display, one needs to know with a great degree of confidence that the color, that one is observing and discussing with an operator who is observing the same image on a different CRT, is the same as the color observed by the operator. The same is true, if the displayed image is one created on a printer and compared with the same image created on a different printer.

Colorimetry, which is the study of color based on both spectral distribution of the energy reflected or transmitted from a test sample and the response of the human eye, as well as the spectral distribution of the illuminating source, provides a method to describe and measure color and enables one to determine when colors match. Through the use of CIE defined Tristimulus Values (which are the amounts of three primary lights which when added produce a visual, or colorimetric match with an original color), one may determine with reasonable certainty that if two colors have the same three CIE Tristimulus values that is, if the Red Tristimulus value of one color is the same as the Red Tristimulus value of the other, and so on for the Green and Blue Tristimulus values, then the appearance of the two colors will be the same to the average observer. CIE stands for the International Commission on Illumination.

It appears, therefore, that the problem of matching color outputs of different displays is readily resolved by providing displays having the same CIE tristimulus values for the same image value inputs.

While the solution in principle is simple, creating a conversion device which will make two or more different displays produce the same tristimulus output values for the same input image values is very difficult. Each of the display devices operates in its own, device dependent, color space where image values at its input are transformed into display image values. The difficulty lies primarily in matching the two transformations occurring within the two display devices for the image values appearing at the input of each, so that both display the same displayed colorimetric values for the same input image values.

The prior art solutions to color matching fall into two fundamentally distinct approaches. The first is based on the decomposition of a color vector to a set of primaries, and known as the primary decomposition technique. Typical of this approach is the technique described in U.S. patent application 5,196,927 filed Mar. 16, 1990, assigned to E. I. du Pont de Nemours and Company. According to this technique, the input image is decomposed into the linear combination of eight primaries (yellow, magenta, cyan, black, red, green, blue, and three-color black). Coefficients for a 4×8 matrix (the values of CYMK for each of the eight primaries) are adjusted such that the color of the eight primaries in the input from both systems to be matched are matched, and the new input values are found by matrix multiplication of an 8×1 matrix (coefficient of decomposition) with the 4×8 matrix. This technique suffers because of the non linearity in the additive properties of color dyes and because the "primaries" used are not mathematically independent.

The more common solution, adopted by the printing industry is the grid sampling technique. This involves using a color transformation formula such that the error between the targeted color and the processed color is minimized. The differences between the various methods in existence are found in the specific transformation formulas. U.S. Pat. No. 4,500,919 issued to Schreiber is a good example of the use of a transformation formula. The difficulty with this approach again lies in the non-linearity of the color addition process and the complexity of the color surfaces in a set of equations.

SUMMARY OF THE INVENTION

The present invention relates to provide a method for matching the color display of at least a first and a second display devices, comprising:

(I) creating a transform LUT for converting input color values to output color values by:
  (1) producing a first preselected plurality of input color values;

(2) using said plurality of input values to display a plurality of color patches in said first and said second display devices;

(3) obtaining a colorimetric value of each of the displayed color patches in each of the displayed devices and using said colorimetric values to create a first and a second model for the first and second devices respectively correlating preselected input color values to displayed colorimetric values for each of the two devices;

(4) inputting to said first and second models a second preselected plurality of color values;

(5) comparing the output of the first model to the output of the second model to obtain an error signal indicative of the difference between the two output signals;

(6) using the error signal to modify the input color values to the second model and again comparing the output of the first model to the output of the second model to obtain a new error signal;

(7) repeating the process of steps (5) and (6) above until the error signal is a minimum; and (8) using the modified color values to create a transform LUT correlating input values to modified values;

(II) using the transform LUT to transform any plurality of source color image values before inputting said image values to an input of the second display device; and (III) displaying said transformed source color image values on said second display device.

When there is no corresponding source image value in the transform LUT correlating an input source color image value to a modified color image value, one can use interpolation to derive a corrected source image value from a closest source and corresponding modified value in the LUT.

Preferably, the first and second preselected pluralities of color image values are the same.

This invention further relates to an apparatus for generating a transform LUT for converting input color values to output color values comprising:

(1) digital color image values input means;

(2) first and second display model means for producing each an output colorimetric tristimulus image values for input color values, each of said model means having an input and an output, the second model input connected to the input means;

(3) an adder device having a first signal input connected to the input means, a second, correction error signal input, a control signal input, and an output connected to the first model input, for outputting modified color values;

(4) means connected to the output of said first and second model means, for comparing the tristimulus values output of the first and second display models and for producing an error signal;

(5) means for testing the error signal to determine if said signal is a minimum error signal, and for outputting a correction error signal and a control signal to the adder, said testing means connected between said means to compare and said adder device; and (6) means also connected to the input means, the adder output, and the means for testing, for receiving the adder output and for generating a transform LUT correlating digital input color values to the modified color values appearing at the output of the adder when the means for testing determines that the error signal is a minimum.

The apparatus may further comprise means for storing the generated LUT. A gamut mapping means may be included between the output of the second model and the means to compare for mapping output values from the second model into a color gamut commensurate to that of the first model.

The apparatus may comprise hardware, or may be a computer programmed through software to perform all of the above operations, or may be a combination of dedicated hardware and computer implemented software.

BRIEF DESCRIPTION OF THE DRAWINGS

The invention can be more fully understood from the following description thereof in connection with the accompanying FIGURES described as follows.

DESCRIPTION OF THE PREFERRED EMBODIMENT(S)

The invention will next be described in detail with reference to the drawings in which similar characters indicate similar elements in all figures of the drawings. During the following discussion, color values are quantized in 256 steps corresponding to an 8 bit system. Other quantizations are possible, and not intended to be excluded because of the use of the 256 steps in the following examples.

The invention comprises a method and apparatus for providing color visual matching of two representations of the same image when the image is displayed in two different displays, so that an observer will on visual examination of the displayed images observe two images having substantially the same color appearance. Using the method or apparatus of this invention causes each of two observers, whose visual response substantially conforms to the visual response of an average observer as defined by the CIE institute, upon observing any one of the color displays under the same or similar surrounding illumination and background, to receive substantially the same visual impression.

Figure 1:
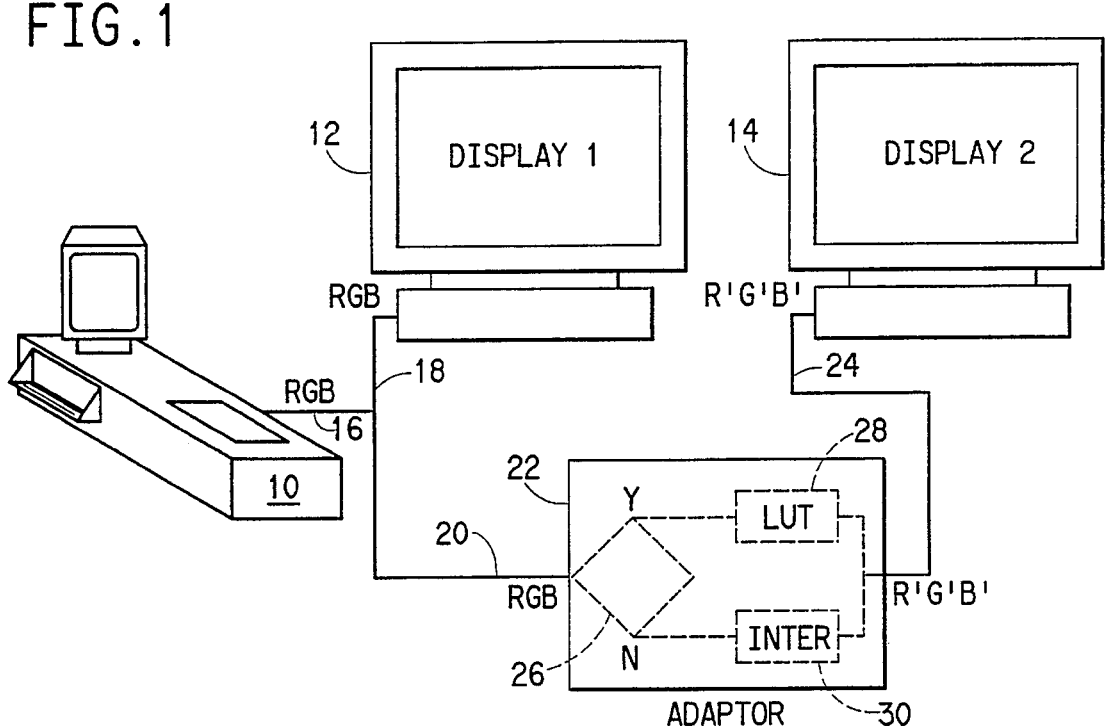
FIG. 1 is a schematic representation of an arrangement in which two matched images are displayed on two CRT displays.

FIG. 1 shows in schematic representation a situation where a color image is displayed on two CRT type displays which receive RGB type inputs to display an image. The image may be stored and manipulated in digital format in a work station 10 which itself may comprise a scanner, an image processor, a display device, and have image storage capabilities, or any portion of the above, or more.

Because the required input to displays 12 and 14 in this example is a digital RGB type signal, the work station outputs over line 16 a digital RGB signal representing a color image. The digital RGB signal comprises a set of color values, one set of three values (R, G, B) for each picture element of the image to be displayed. The signal is directed over line 18 to the first display monitor 12 on which the colored image is displayed. The digital RGB signal is also sent over line 20 to the second display monitor 14, which could be located at a location different than the location of the first display 12.

Prior to applying the RGB signal to the second monitor 14, there is interposed an adaptor 22 which receives the digital RGB signal and after processing the signal, outputs a signal comprising a new set of digital color values R', G', B' over line 24 to an input of the second display monitor 14 for each image pixel.

The adaptor 22 comprises a receiving and determining element 26 which receives each set of R, G, B values and checks them against a plurality of sets of R, G, B values comprising a transform look up table (LUT) 28 which correlates R, G, B values to a new set of R', G', B' values which when used as an input to the second display monitor 14 will generate a pixel whose colorimetric value will match that of the pixel generated by the same R, G, B set of color values in the first display monitor 12.

If the receiving and determining element 26 identifies a corresponding set of R, G, B values in the LUT 28, it outputs the appropriate R', G', B' values on line 24. If not, the R, G, B input is directed to an interpolator 30 where R', G', B' values are derived by interpolation using existing adjacent sets of R, G, B values in the LUT. Preferably, the selection of the R, G, B values for the development of the transform LUT 28 is such that values derived by interpolation produce a visually acceptable match of the displayed pixel in the two monitors 12 and 14.

Figure 2:
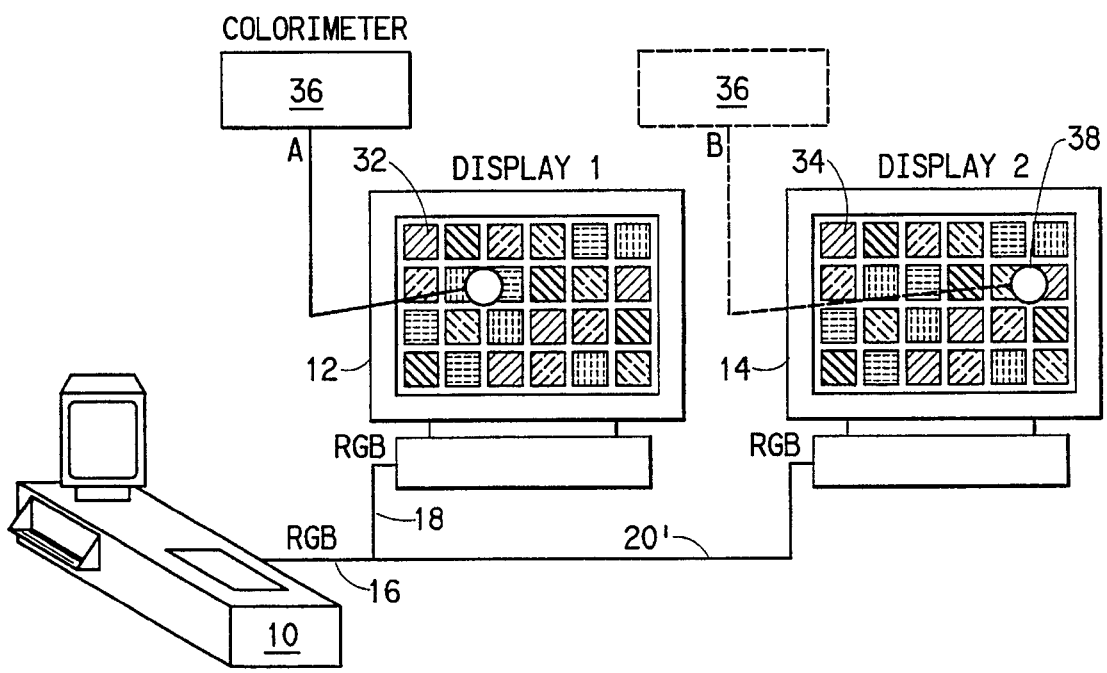
FIG. 2 is a schematic representation showing the arrangement used in obtaining data for generating the LUTs used in modeling the two displays of FIG. 1.
Figure 3:
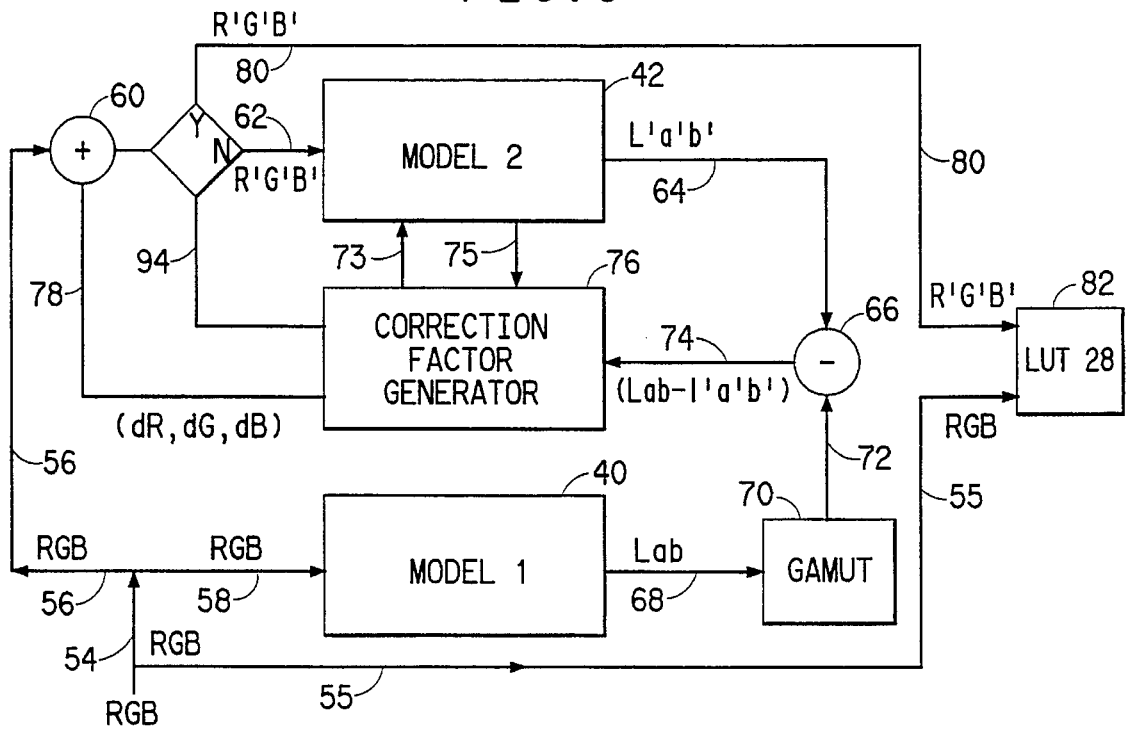
FIG. 3 is a schematic representation of the process for obtaining the transform LUT used in the adaptor in the arrangement shown in FIG. 1.
Figure 4:
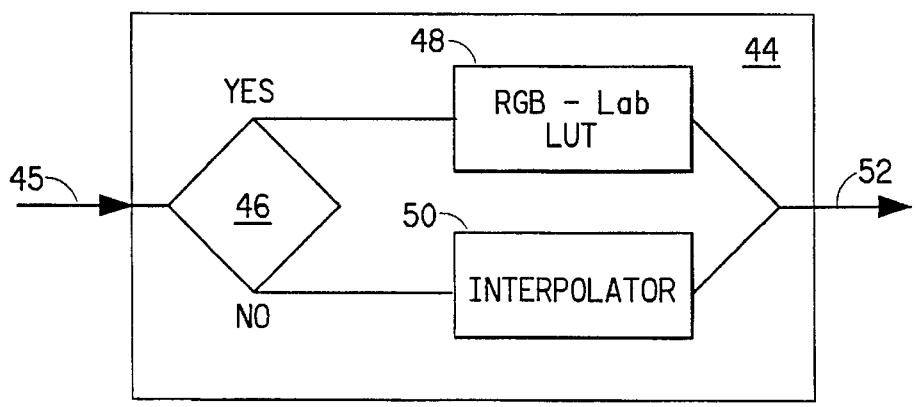
FIG. 4 is a generic representation of a display model.

For this system to operate with any degree of success, the development of the transform LUT 28 is critical. The values generated by this LUT 28 must indeed lead to values that correctly reproduce colors on the second display 14 which visually match the colors on the first display 12. FIGS. 2, 3 and 4 help explain how the LUT 28 is generated.

The first step in developing the transform LUT 28 is the creation of two models representing the two displays whose output is to be matched. FIG. 2 shows how this is accomplished.

The work station 10 is used to generate and output over line 16 a set of digital R, G, B color values in a regular pattern which is selected to supply color values closely enough spaced so that interpolation of values between existing values is reasonably accurate. Preferably, but not necessarily, the output is adjusted so that the color values produce displays 32 and 34 on the first and second display monitors 12 and 14, respectively, comprising a plurality of different color patches on display screens of the display monitors 12 and 14. As an example, the work station 10 may generate a plurality of digital RGB values such as shown in the following table I:

TABLE I

R: 0, 13, 26, 51, 76, 102, 128, 153, 178, 204, 230, 255.
G: 0, 13, 26, 51, 76, 102, 128, 153, 178, 204, 230, 255.
B: 0, 13, 26, 51, 76, 102, 128, 153, 178, 204, 230, 255.

Each combination of R, G, B values from this table represents a set $(R, G, B)_n$ of color values. In this illustration where there are 1728 possible such sets of R, G, B values, n=1 to 1728.

These 1728 sets of R, G, B values are supplied to both display monitors 12 and 14 over lines 18 and 20' creating a total of 1728 displayed patches for each of the monitors 12 and 14, corresponding to the 1728 different combinations of the selected values. All 1728 patches are not necessarily displayed on each monitor screen simultaneously.

A colorimetric measuring device 36 is used to read the displayed patches displayed in the first and second monitors 12 and 14 as shown in FIG. 2. The output of the colorimetric device is a colorimetric set of color values for each of the patches. In our preferred embodiment, the output of the colorimeter are CIE defined L, a and b sets of color values in the Lab color space. Output colorimetric measurements given in other colorimetric color spaces are equally acceptable, such as XYZ, Tristimulus CIE defined RGB, etc. Uniform as well as non-uniform color spaces may be used. However, values in non-uniform color spaces related to a uniform color space with a known mathematical relation may result in increased calculation steps which must be compared with any gained advantage as a result of this selection, to determine if the particular choice of color space is justified. (For a description of the different color spaces and related terminology, see, in general, DIGITAL IMAGE PROCESSING, 2nd edition, by William Pratt, published by John Wiley and Sons, Inc. pages 62–73.)

Once the measurement of all patches is completed, two LUTs are compiled, representing the transfer functions of the two monitors 12 and 14. The first LUT will consist of the $(RGB)_n$ sets of values and the corresponding $(Lab)_n$ sets of values read off the display on monitor 12 and the second LUT will consist of the same $(RGB)_n$ sets of values and the corresponding $(L'a'b')_n$ sets of values read off the display monitor 14.

Referring to FIG. 3, a first and a second model 40 and 42 are built representing the two monitors 12 and 14, respectively. FIG. 4 shows a generic model 44 structure, which is used throughout this description in this invention to convert color values. The model 44 comprises an LUT 48, which is the particular device derived LUT representing the device transfer function. In this example, the LUT 48 for the first model 40 will be the first LUT correlating the (RGB)n sets of color values to the $(Lab)_n$ sets of values, and the LUT 48 for the second model 42 will be the second LUT correlating the same $(RGB)_n$ sets of color values to the $(L'a'b')n$ sets of values.

In addition to the LUT 48, the model 44 comprises a receiving and determining means 46 similar to, or the same as, the receiving and determining means 26 described earlier, and a mathematical interpolating means 50, also similar to, or the same as, the previously described interpolating means 30.

FIG. 3 schematically represents the generation of the transform LUT. Sets of R, G, B color values from a preselected plurality of R, G, B sets of color values are used.

This plurality of R, G, B sets of values is, preferably, also produced in the work station 10, and, again preferably, is the same as the sets of (R, G, B)$_n$ values from Table I previously used to generate the two LUTs for the two display models 40 and 42.

Each (R, G, B) n set of values is directed to the input of the first model 40 over lines 54 and 58. Model 40 produces an output of (Lab)n values corresponding to the input (R, G, B)$_n$ values for this model 40. The same (R, G, B)$_n$ values are directed to the second monitor model 42 over line 56. Ahead of model 42, there is an adder 60 which operates to add to the R$_n$, G$_n$, and B$_n$ components of the (R, G, B)$_n$ set of values any correction factor dR$_n$, dG$_n$, dB$_n$, appearing on line 78. At first, nothing appears on line 78, and the R$_n$, G$_n$ and B$_n$ values are applied to the input of model 42 unaltered. Model 42 also produces an output set of (L'a'b')$_n$ color values corresponding to the input (R, G, B)$_n$. This output appears on line 64.

Figure 5:
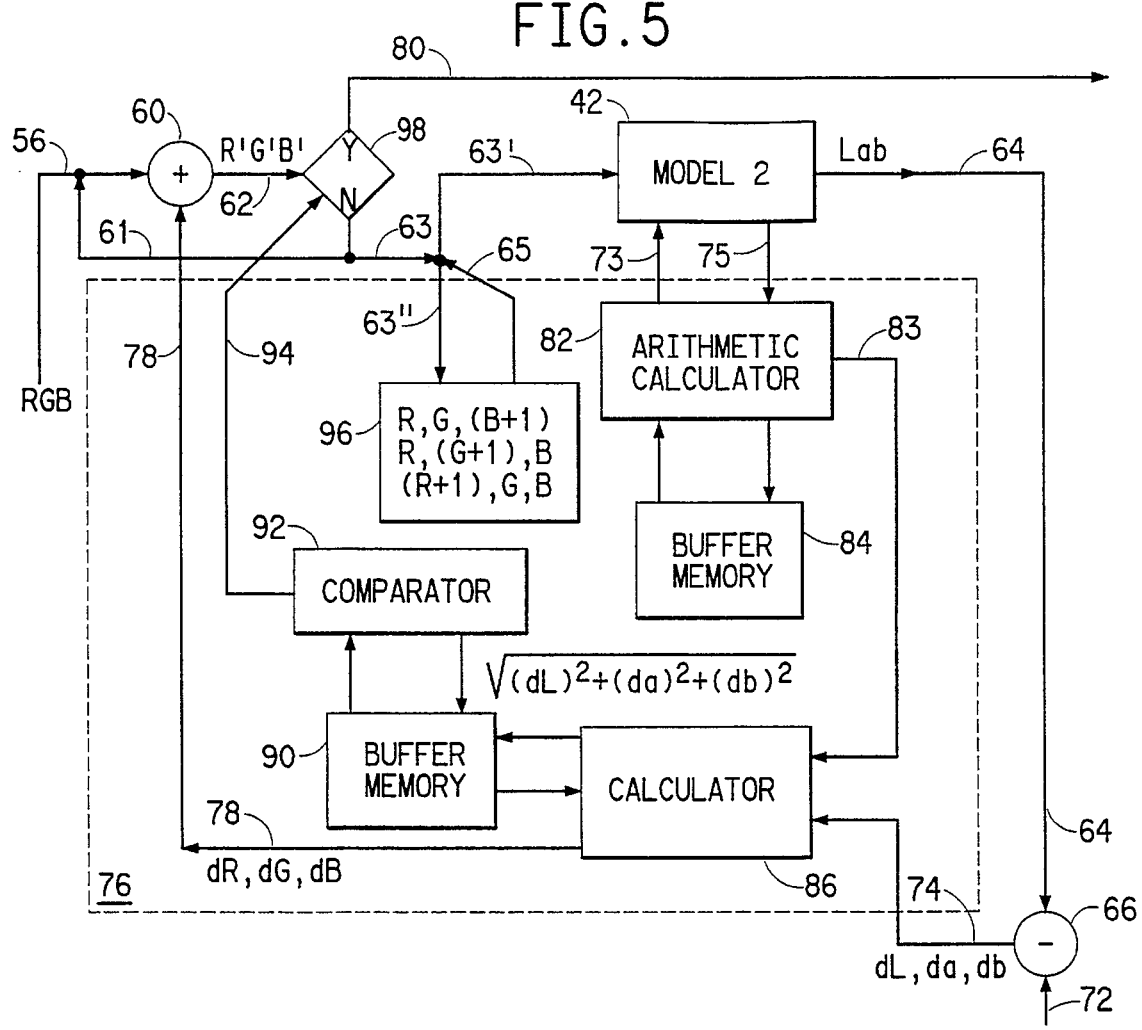
FIG. 5 is a schematic representation of the process used in deriving the correction factors shown in FIG. 3.

The (Lab)$_n$ values over line 72 and the (L'a'b')$_n$ values over line 64 are next compared in comparator 66 and a difference signal [(Lab)$_n$–(L'a'b')$_n$] is generated and directed over line 74 to correction factor generator 76. Using this difference signal, correction factor generator 76 produces correction factors dR$_{n(1)}$, dG$_{n(1)}$, dB$_{n(1)}$ (in a manner to be explained herein below) which are sent over line 78 and added to the corresponding components of the (R, G, B)$_n$ set of values in adder 60, resulting in a new set of color values R$_{n(1)}$'=R$_n$+dR$_{n(1)}$, G$_{n(1)}$'=G$_n$+dG$_{n(1)}$, and B$_{n(1)}$'=B$_n$+dB$_{n(1)}$ on line 62. These new values are again applied to the input of model 42 which produces a new output set of L$_2$'a$_2$'b$_2$' values on line 64 which is again compared in comparator 66 with the set of (Lab)$_n$ values from model 40. A new set of correction factors dR$_{n(2)}$, dG$_{n(2)}$, and dB$_{n(2)}$ is produced and added to R$_{n(1)}$', G$_{n(1)}$' and B$_{n(1)}$' to produce a new set of R$_n$', G$_n$', and B$_n$' values An error "E" defined as:

$$E = [(L-L')^2 + (a-a')^2 + (b-b')^2]^{1/2}$$

is used to determine when to stop this cycle. Referring to FIG. 5, error "E" is compared in comparator 92 with preselected minimum acceptable limits or a "0" value. If the error is "0", or within the preselected acceptable limits, a signal over line 94 switches switch 98 (which is part of adder circuit 60) to feed the R$_n$', G$_n$' and B$_n$' values which produces the minimum over line 80 to the transform LUT compiler 82, rather than to model 42; the next input set of values (R, G, B)$_{n+1}$ is then applied over line 54 to the two models and the whole process is repeated for this new set of values and so on.

The set of R$_n$'G$_n$'B$_n$' values which produced this zero or acceptable minimum error are sent over line 80 to the LUT compiler 82 where the (R, G, B)$_n$ and corresponding (R'G'B')$_n$ sets of values are used to compile the transform LUT 28 so that for each set of (R, G, B)$_n$ values there is a corresponding set of (R',G',B',)$_n$ values. Means to store the transform LUT 28 is included in the compiler 82. This LUT 28 is the the same transform LUT shown in FIG. 1 discussed earlier.

The correction factor generator 76 produces the dR, dG and dB correction factors as follows. The input to the correction factor generator 76 is the difference signal produced by the comparator 66, specifically [(Lab)$_n$–(L'a'b')$_n$]. The individual components of this signal are: dL which equals (L—L'), da which equals (a—a') and db which equals (b—b'). The correction factors dR, dG and dB, and the difference signals dL, da, and db are related by the following relationships:

$$(\partial b/\partial G)da - (\partial a/\partial G)db = \quad (1)$$
$$[(\partial b/\partial G)*(\partial a/\partial R) - (\partial a/\partial G)*(\partial b/\partial R)]dR +$$
$$[(\partial b/\partial G)*(\partial a/\partial B) - (\partial a/\partial G)*(\partial b/\partial B)]dB$$

$$(\partial a/\partial G)dL - (\partial L/\partial G)da = \quad (2)$$
$$[(\partial a/\partial G)*(\partial L/\partial R) - (\partial L/\partial G)*(\partial a/\partial R)]dR +$$
$$[(\partial a/\partial G)*(\partial L/\partial B) - (\partial L/\partial G)*(\partial a/\partial B)]dB$$

$$dL = (\partial L/\partial G)dG + (\partial L/\partial R)dR + (\partial L/\partial B)dB. \quad (3)$$

The actual numeric values for $\partial L/\partial R$, $\partial L/\partial G$, $\partial L/\partial B$, etc. for use in solving the above system of equations, are obtained by the process schematically illustrated in FIG. 5. The input R$_n$, G$_n$, B$_n$ values are changed by holding two the same and incrementing the third by one unit in incrementing module 96. This module comprises a memory for temporarily holding the input values of R$_n$, G$_n$, and B$_n$ and an arithmetic means for incrementing each of those values by 1 and for applying various combinations of R$_n$, G$_n$, B$_n$, R$_n$+1, G$_n$+1, and B$_n$+1 sets of values to the input of model 42.

An example which uses illustrative RGB values, will be used to explain the derivation of the numerical values for the partial derivatives needed to solve the above equations, (1) (2) and (3). Let the input R$_n$, G$_n$, and B$_n$ values for a set of (R, G, B)$_n$ values be 100, 100, 100. Assume that when these values are applied to both models 40 and 42, two sets of Lab values, (Lab)$_n$ and (L'a'b')$_n$ are produced such that the error E as previously defined is different than "0" or a preselected acceptable minimum. Incrementing module 96 produces over line 65 three new color value sets, R$_n$, G$_n$, (Bn+1), having the numerical values (100, 100, 101) in this illustrative example, R$_n$, (Gn+1),Bn, having the numerical values (100,101,100) and (Rn+1), Gn, Bn, having the numerical values (101,100,100). These new values are applied to model 42 over line 63'. The resulting variations in the components of the (L'a'b') n values produced by model 42 are directed to an arithmetic calculator 82 over line 75 and to buffer memory 84. The calculator 82 performs the operations: (L—L')/R—(R+1), (L—L')/G—(G+1), (L—L')/B—(B+1), (a—a')/R—(R+1), (a—a')/G—(G+1), (a—a')/B—(B+1), (b—b')/R—(R+1), b—b'/G—(G+1) and b—b'/B—(B+1), to derive the partial derivative values ($\partial L/\partial R$, $\partial L/\partial G$, etc.) used in equations (1), (2) and (3) above.

The results of the calculator 82 are supplied over line 83 to another calculating unit 86. The dL, da, and db values from comparator 66 are also directed to this calculating unit 86. Unit 86 solves the system of equations (1), (2) and (3 ) for dR, dB and dG to derive the correction factors.

A problem is sometimes encountered in determining a set of values that will produce a best color match on two different displays for the same input set of color values. The problem is that a minimum error may be arrived at, which may not be an absolute minimum, but only what may be referred to as a local minimum, and there may be other combinations of values (R', G', B')$_n$ which could produce a smaller even a zero error and a better color match. To test for this possibility, an optimization operation is performed. A buffer memory 90 holds the input (R, G, B)$_n$ values, the corresponding (R', G', B') values and the error "E$_n$" resulting from the use of this combination. The next set of (R, G, B)$_n$+$_1$ values is processed and it, the corresponding (R', G', B')$_{n+1}$ values, and resulting error "E$_n$" are also stored. The following (R, G, B) n+2, (R', G', B')$_{n+2}$ and "E$_3$" are stored, etc., until a set of (R, G, B)$_{n+x}$ and (R'G'B')$_{n+x}$ values for which the error "E$_x$"=0 is encountered. Once this true "0"

error has been identified, a backtracking operation is performed to determine if a "0" error can be obtained by correcting the set of (R, G, B)$_{n-x-1}$ values using as an input to the model 42 the (R, G, B)$_{n=x}$ set of values (which is the set for which a "0" error was obtained) while model 40 receives the (R, G, B)$_{n-x-1}$ set. This operation will produce a new set (R1', G1', B1')$_{n=x-1}$ of values and a new error "E1"$_{n=x-1}$ for the input values (R, G, B)$_{n=x-1}$. If "E1"$_{n-x-1}$="0" the (R1', G1', B1')$_{n=x-1}$ set of values is substituted for the (R'G'B')$_{n=x-1}$ set of values, and the transform LUT 28 is recompiled using these (R1', G1', B1')$_{n-x-1}$ values as corresponding to the (R, G, B)$_{n=x-1}$ set.

If no "0" error is obtained with the above process, then the earlier arrived at result minimum is compared and if lower than the newly found minimum, the result stays Otherwise the R', G', B' values giving the least error are used in compiling the transform LUT 28 as they will result in a more accurate match. The optimization process is then repeated for the next (moving backwards) set of (R, G, B)$_{n=x-2}$ input values and sequentially for all (R, G, B)$_n$ sets of values for n<x always using the values from the set with "E"=0 whose ny number is the closest to the tested set n number. When all stored sets of (R, G, B)$_n$ values have been tested in this manner, the memory contents of the buffer memory 90 are erased and a new set of input (R, G, B)$_n$ beginning with the next n, i.e., n=x+1 is applied over line 54 and the process of compiling the transform LUT 28 continues.

For illustration purposes, lets assume that an input set of values (R, G, B)$_{20}$ =(100, 100, 100) is applied to both the first model 40 and the second model 42 and that this results in a corresponding set of values (R',G',B')$_{20}$=(100, 102, 103,) which gives a minimum acceptable error but different from zero. Let us further assume that the next set of input values is (R, G, B)$_{21}$ and that (R, G, B)$_{21}$ =(110, 100, 100). Also let us assume that the corresponding set of values (R', G', B')$_{21}$ are (105, 100, 101), and that the error in this instance is zero.

When the zero error is detected, the optimization process begins, and no new input sets of (RGB)$_n$ values are applied to line 54.

The set preceding the set which had the zero error, i.e., set of input values (R, G, B)$_{20}$ =(100, 100, 100) is applied to the input of model 40. However, the set (R',G',B')$_{21}$ =(105, 100, 101) is applied to the input of the second model 42 (rather than the set (R, G, B)$_{20}$) and a new set of corresponding (R1'G1'B1')$_{20}$ values is arrived at, i.e., 101, 102, 103, which will either give a zero error or another minimum error. If the result is a zero error or if the new error is smaller than the previous, the new (R1'G1'B1')$_{20}$ values are substituted for the original values (R'G'B')$_{20}$ that were used earlier in the compilation of transform LUT 28 and will produce a closest match.

The process described is best performed in a computer, or if in hardware, under the control of a computer suitably programmed to perform the above computations. The diagram of FIG. 5 is provided for illustration, rather than as an actual working embodiment of hardware sufficient to perform the above process, so as to enable one to properly program a computer for this task.

Referring again to FIG. 3, there is shown a block 70 between the output of model 40 and the input to comparator 66. This represents an optional color gamut correcting device, which may be used to match the output color gamuts of the two display devices. Gamut matching is often often used because the color range that is possible to reproduce with a particular display is usually not identical with the color range possible to reproduce with another. Thus, while both displays have a large number of colors that are reproducible by both, there may be certain combinations of sets of color values that are outside the reproduction capability of one or the other display. While the use of the transform LUT 28 in itself inherently provides color gamut matching between the two devices considered, additional color gamut matching may be used in the development of the LUT 28, by inserting a gamut matching device 70 as shown. This device will perform a preselected mathematical manipulation to the (Lab)n set of values so that there will not be any sets for which there are no corresponding (L'a'b')$_n$ values from the model 42. Such mathematical manipulation may be as simple as simple truncation or as complicated as data compression.

These types of mathematical operations are well known in the art of color matching. For a brief discussion of gamut matching and the necessity of color compression, also see "COLORIMETRY FOR ELECTRONIC IMAGING SYSTEMS, An intensive short course for Scientists and Engineers", Copyright 1991, Munsell color science laboratory, Rochester Institute of Technology, by R. S. Berns and R. S. Hunter, Chapters 27 and 28.

Figure 6:
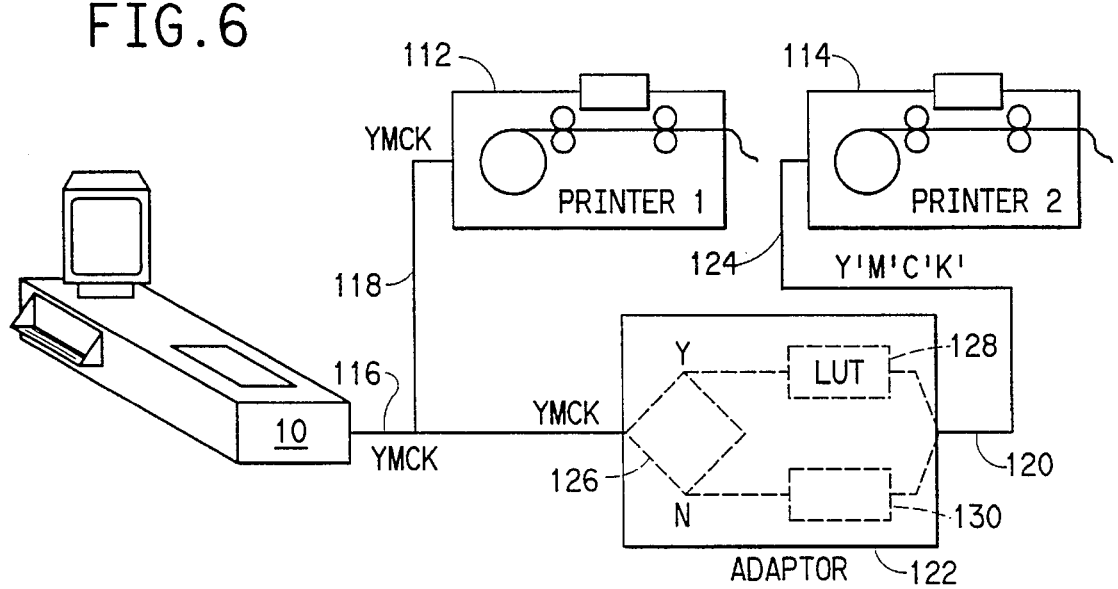
FIG. 6 is a schematic representation of an arrangement in accordance with this invention in which two matched images are printed using two printing devices.
Figure 7:
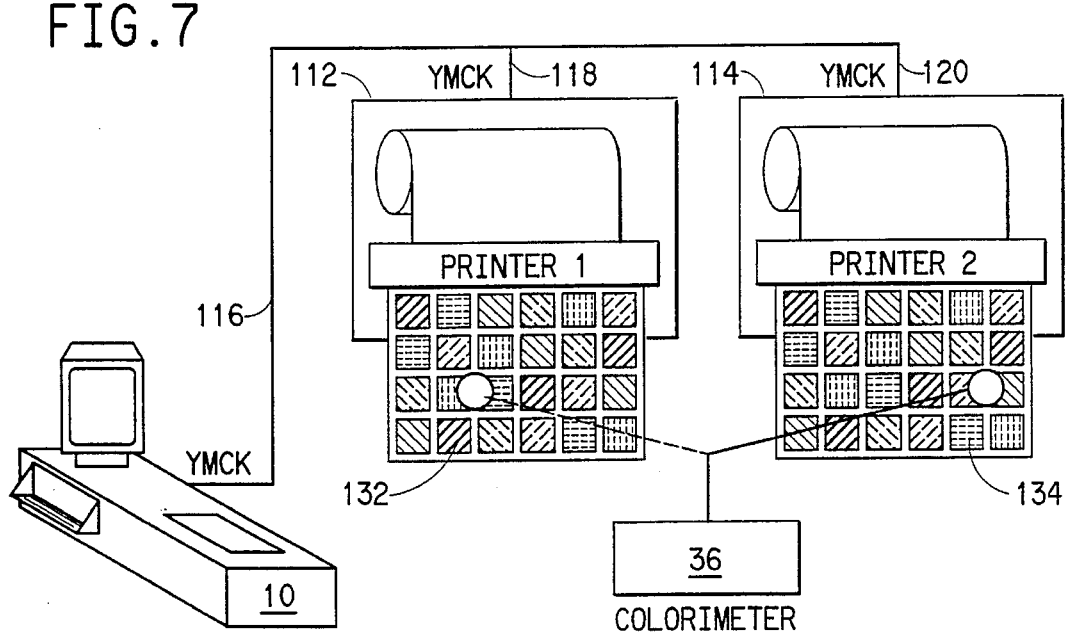
FIG. 7 is a schematic representation showing the arrangement used in obtaining data for generating the LUTs used in modeling the two printing devices of FIG. 6.
Figure 8:
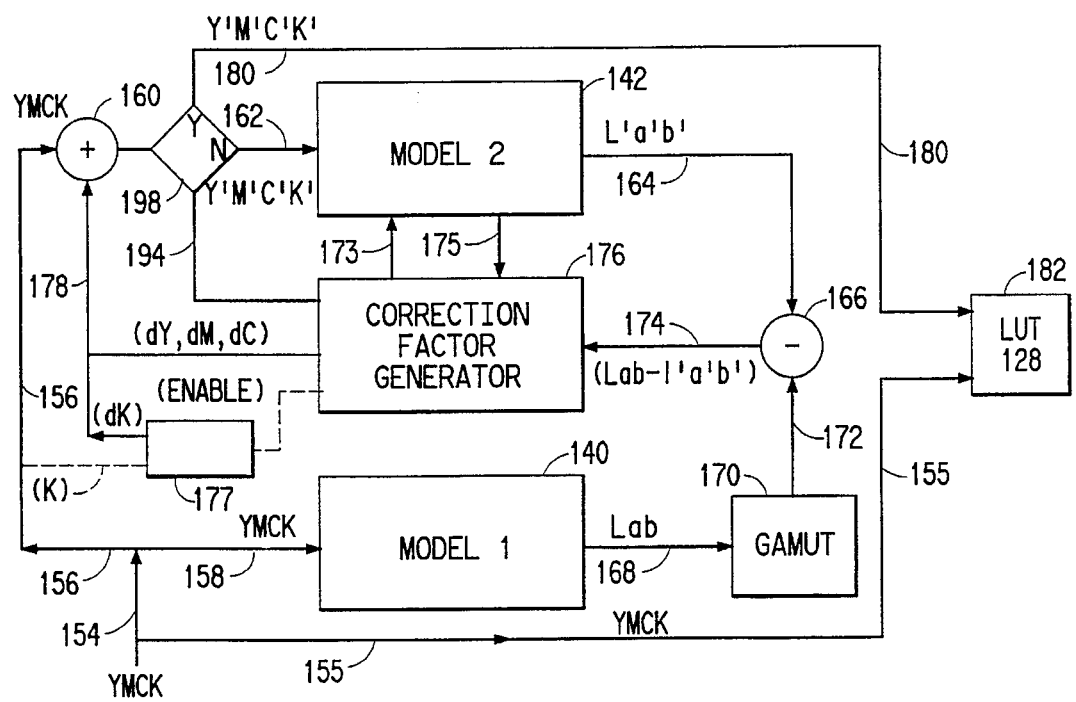
FIG. 8 is a schematic representation of the process for obtaining the transform LUT used in the adaptor in the arrangement shown in FIG. 6.

FIGS. 6, 7 and 8 illustrate the case where the images that are to be matched are images produced in color proofers or printers which use a typical four color reproduction system with four color inks, such as Yellow (Y), Magenta (M), Cyan (C) and Black (K).

Referring to FIG. 6, as in the previous example, a work station 10 generates digital color values representing pixels of a color image. Since a four color system is used and the reproducing equipment accepts YMCK signals, the work station 10 output is a set of YMCK signals over output line 116. The signals are directed to a first printer 112 over line 118 and to a second printer 114 over line 120. Ahead of the input to printer 114 is placed an adaptor 122 which again comprises a transform LUT 128, a receiving and determining element 126 and an interpolator 130. The LUT 128 is a transform LUT which correlates a plurality of YMCK values to a second plurality of Y'M'C'K' values such that colored pixels produced using a set of YMCK values in printer 112 and a corresponding set of Y'M'C'K' values from the LUT 128 in printer 114 will be identical or virtually identical to the standard CIE average observer when viewed under similar illumination and surroundings.

As for the previous example the interpolator 130 is used to supply corresponding values for YMCK input values not listed in the transform LUT 128. The transform LUT 128 has been compiled using substantially the same process as for the transform LUT 28 used in the previous example. As illustrated in FIG. 7, the work station 10 may generate a plurality of digital YMCK values such as shown in the following Table II:

TABLE II

Y: 0, 13, 26, 51, 76, 102, 128, 153, 178, 204, 230, 255.
M: 0, 13, 26, 51, 76, 102, 128, 153, 178, 204, 230, 255.
C: 0, 13, 26, 51, 76, 102, 128, 153, 178, 204, 230, 255.
K: 0, 13, 26, 51, 89, 128, 178, 255.

Each combination of Y,M,C,K, values from this Table II represents a set (Y,M,C,K) n of color values. In this illustration, there are 13824 possible such sets of Y,M,C,K, and n=1 to 13824 values.

The 13,824 patches resulting from the different color value combinations above are printed by both printers 112 and 114 to provide two sets 132 and 134 of 13,824 patches each. Again as before, a colorimetric measuring device 36 is used to read all of the above patches 132 and 134 and the colorimeter output is used to compile two LUTs representing the transfer functions of the two printers 112 and 114. Again it is preferred that the colorimeter output is in the Lab color space and the LUTs correlate $(Y,M,C,K)_n$ inputs to $(L,a,b)_n$ outputs for each of the printers 112 and 114. These LUTs are used to construct models 140 and 142 using the generic model diagram shown in FIG. 4 for the two printers 112 and 114, respectively.

FIG. 8 illustrates the process followed for the compilation of the transform LUT 128. This process is similar to the process described earlier for the compilation of the transform LUT. The LUT, however, correlates two pluralities of color sets, each set having four rather than three variables. Of the four $C_n$, $Y_n$, $M_n$,$K_n$ variables, the three $C_n$, $Y_n$,$M_n$ variables are independent variables, but the fourth, $K_n$ is not. $K_n$ is dependent on the other three from which it is derived. The relationship between CYM and K is well known in the graphic arts.

Preselected sets of $(C,Y,M,K)_n$ values from the work station 10 or elsewhere, are directed to the inputs of both model 140 and 142 over lines 154, 162, 156 and 158. It is preferred that the preselected values be the same as the values used to compile the LUTs used in the models 140 and 142 and for purposes of this description the same value combinations resulting using the values in Table II.

Each input set of values $(C,Y,M,K)_n$ is applied directly to the input of model 140 over lines 154 and 158. The same set of values is also applied over line 156 to one input of adder 160. The adder output is directed to switching circuit 198. The output of switching circuit 198 is controlled by a signal over line 194 and may be directed to the input of model 142 or to transform LUT compiler 182 over lines 162 and 180, respectively. The input set of values is also applied to compiler 182 over line 155.

The adder 160 has a second input on which are applied correction factors $dC_n$, $dY_n$ and $dM_n$ produced in the correction factor generator 176. When the $(Y,M,C,K)_n$ set of values first appears at the adder 160 input, there are no correction factors applied to the adder and the values $Y_n,M_n$, $C_n,K_n$ are applied to the input of model 142 unaltered. Model 140 produces an output set of values $(L,a,b)_n$ and model 142 produces another set $(L',a',b')_n$. These two sets are compared in comparator 166. For this description, it is assumed that an optional gamut adjustment module 170 is not used to modify the $(L,a,b)_n$ output of model 140 prior to applying it to the comparator 166 over line 172.

The comparator 166 produces a difference signal $[(Lab)_n-(L'a'b')_n]$. This output is directed over line 174 to correction factor generator 176. Using this difference signal, correction factor generator 176 produces three correction factors $dY_{n\ (1)}$, $dM_{n\ (1)}$, $dC_{n(1)}$ (in a manner similar to the manner in which correction factor generator 76 produced the dR, dG, and dB factors as previously explained). The correction factors are sent over line 178 and added to the corresponding components of the $(Y,M,C,K)_n$ set of values in adder 60, resulting in a new set of color values $Y'_{n(1)}=Y_n+dY_{n(1)}$, $M'_{n(1)}=M_n+dM_{n(1)}$, and $C'_{n(1)}=C_n+dC_{n(1)}$ on line 162.

The fourth value, $K_n$ is stored in element 177 which comprises a buffer memory and a means to modify the stored value $K_n$ by predetermined increments. At this time $K_n$ remains constant and these new $Y'_{n(1)}$, $M'_{n(1)}$, $C'_{n(1)}$, and $K_n$ values are again applied to the input of model 142 which produces a new output set of $L_2'a_2'b_2'$ values on line 164 which is again compared in comparator 166 with the set of $(Lab)_n$ values from model 140. A new set of correction factors $dY_{n(2)}$, $dM_{n(2)}$, and $dC_{n(2)}$ is produced and added to $Y'_{n(1)}$, $M'_{n(1)}$ and $C'_{n(1)}$ to produce a new set of $Y_n'$, $M_n'$, and $C_n'$ values. Again, an error "E" is defined as:

$$E=[(L-L')^2+(a-a')^2+(b-b')^2]^{1/2}$$

The correction factor generator 176 also includes means to calculate, compare and store this error $E_n$ and the corresponding $(YMCK)n$ and $(Y'M'C'K)_n$ set of values that resulted in this error $E_n$.

The above process is repeated continuously correcting the original input values $Y_n,M_n$, $C_n$, with $K_n$ held constant until the error E is zero or a predetermined acceptable minimum. If a zero error is found, then the two sets of values produce a perfect match and the search terminates. Switch 198 is actuated and the two sets of values are used in the compiler 182 to compile the transform LUT 128. If only a minimum is arrived at it is again stored in the buffer memory and $K_n$ is incremented in unit 177 and the process repeated in search of another set of $(Y''M''C''K')n$ values yielding another minimum. This new minimum is compared with the previously found one. The $(Y'M'C'K)_n$ values or the values $(Y''M''C''K')n$ which produced the best minimum are kept.

The correction factor generator in this instance solves a system of differential equations that is of the same format as previously discussed. The equations only differ in terms of variable designation and are as follows:

$$(\partial b/\partial Y)da - (\partial a/\partial Y)db = \qquad (1a)$$
$$[(\partial b/\partial Y) * (\partial a/\partial M) - (\partial a/\partial Y) * (\partial b/\partial M)]dM +$$
$$[(\partial b/\partial Y) * (\partial a/\partial C) - (\partial a/\partial Y) * (\partial b/\partial C)]dC$$

$$(\partial a/\partial Y)dL - (\partial L/\partial Y)da = \qquad (2a)$$
$$[(\partial a/\partial Y) * (\partial L/\partial M) - (\partial L/\partial Y) * (\partial a/\partial M)]dM +$$
$$[(\partial a/\partial Y) * (\partial L/\partial C) - (\partial L/\partial C) * (\partial a/\partial C)]dC$$

$$dL = (\partial L/\partial Y)dY + (\partial L/\partial M)dM + (\partial L/\partial C)dC. \qquad (3a)$$

The partial derivatives are calculated in the same manner as the partial derivatives were calculated for the R, G, B, case, by incrementing the $Y_n,M_n$, $C_n$ values by one, as explained earlier with the help of FIG. 5.

The issue of whether a minimum error $E_n$ is a true minimum error or a local minimum, meaning that there may be another smaller error resulting from a different combination of $(C', Y', M', K')_n$ values which could be found by starting with a different input set to the second model 142, rather than the $(Y,M,C,K)_n$ set that was used is again a problem. The same testing and optimization process described earlier can be used in this case too, to test and discover whether there may be other better combinations of $(Y', M', C', K')_n$ values, by holding in a buffer memory all the consecutive sets of $(Y,M,C,K)_n$, the corresponding $(Y'M'C'K)_n$ sets and error $E_n$ as described earlier. However, it has been found that more accurate results may be obtained by following a somewhat more calculation intensive process. This process utilizes two input sets of values which have resulted in a zero error as inputs to obtain two optimized sets of $(Y1', M1', C1', K1')_n$ and $(Y2', M2', C2', K2')$ values in addition to the $(Y', M', C', K')_n$ set and then selecting the set that produces the best match, i.e., least error, from the three sets.

Because of the presence of the fourth color K, which is not an independent color as the Y,M,C, and which by its dependency on the other three can introduce a number of color combinations resulting in matching colors, the existence of two different sets of values both producing a perfect match is also possible. Further, the optimization process must be able to rationally select the set that will produce the better overall match if used in the compilation of the transform LUT 128. When two sets produce perfect matches, then the one that produces better interpolation results for input values that are not present in the LUT will be selected.

The optimization process adopted for this case, is based on selecting a predetermined fixed number "x" of sets of values $(Y,M,C,K)_n$, the corresponding $(Y', C', M', K')_n$ and the associated error $E_{nx}$ and, then, proceeding with the optimization calculation using zero error resulting set values from either side of a target set to derive two sets of possibly lesser error resulting values in addition to the set originally found. Thus, the input set $(Y,M,C,K)_{n8}$, for instance, for which the set of $(Y'C'M'K')_{n8}$ gave us originally a minimum but non zero error, will be optimized using preceding and following values, to obtain $(Y1', C1', M1', K1')_{n8}$ values with data from a set $(Y', C', M', K')_{ny}$ and $(Y'2,M'2,C'2,K'2)_{n8}$ using data from a set $(Y',C',M',K')_{nz}$ where y>8 and z<8 and where both the "ny" and "nz" sets are the sets which produced a zero error closest to the set n=8.

The following illustrative example is provided to explain the optimization process based on a fixed number of value sets discussed above.

Assume that the transform table 128 is to be constructed using the $(YMCK)_n$ sets of color values from Table II. Let us further assume that we are at a stage in the process where the sets of $(YMCK)_n$ shown in Table III have been sequentially introduced over line 154 to model 140, line 156 to adder 160 and line 155 to LUT compiler 128. As a result, corresponding sets of (Y'M'C'K') of values and associated error En values have been obtained. The errors En at this time have not been tested for optimum error condition, for errors different than zero. The number of sets used for optimization will be limited to four (that is x=4), to make the illustration simpler. The four sets of values and associated error values held in memory at the beginning of the optimization are shown in Table III.

TABLE III

| Set # | (Y, M, C, K) | (Y', M', C', K') | E |
|---|---|---|---|
| n | 76, 76, 76, 89 | 73, 72, 78, 90 | 0 |
| n + 1 | 76, 76, 102, 89 | 73, 73, 100, 89 | 0.1 |
| n + 2 | 76, 76, 128, 89 | 73, 75, 131, 91 | 0 |
| n + 3 | 76, 76, 153, 89 | 73, 71, 152, 93 | 0 |

For input sets n, n+2 and n+3 the error is zero. Thus, we have perfect match and can accept the (Y,M,C,K) and corresponding (Y', M', C', K') values in the compilation of the transfer table 128. However, we need to check the results of set n+1 to see if a better match may be available.

We proceed as we did earlier in the optimization process discussed for the (R, G, B) example. However, the process is done with two sets of input values to model 142, the sets that gave a zero match located on either side of the set that is optimized. In this example, the set that is optimized is set n+1 and the two sets, that gave zero error on the two sides of set n+1, are the n set and the n+2 set. We apply the $(Y,M,C,K)_{n+1}$ (i.e., 76, 76, 102, 89) set of values again to model 140, but we apply to model 142 through the adder 160 first the $(Y',M',C',K')_n$ (i.e., 73, 72, 78, 90) set of values which is the set corresponding to the "n" input, the set which gave a zero error in matching the input values for "n".

The $(Lab)_{n+1}$ and $(L'a'b')_n$ outputs from the two models are compared in comparator 166 and new correction factors $dY'_n$, $dM'_n$, $dC'_n$, are generated which result in a new set, $Y'1_{n+1}$, $M'1_{n+1}$, $C'1_{n+1}$, $K'1_{n+1}$ of values when added to the $(Y',M',C',K')_n$ in adder 160. As before, a new set of L'a'b' values is produced and again compared in the comparator 166, and the process repeated, including the K incrementing step, until a minimum error value is found again. Assume these new values to be $Y'1_{n+1}=73$, $M'1_{n+1}=74$, $C'1_{n+1}=100$ and $K'1_{n+1}=88$. Let us further assume that this set of values results in a perfect match and a zero error. We temporarily store these results.

Next we repeat the above process using this time the set of $(Y'M'C'K')_{n+2}$ values as an input to the adder 160, while the $(Y,M,C,K)_{n+1}$ set continues to be applied to model 140. This time we find that another set of $(Y'2, M'2, C'2, K'2)_{n+1}$ values, i.e., $Y'2_{n+1}=71$, $M'2_{n+1}=76$, $C'2_{n+1}=100$ and $K'2_{n+1}=91$, where the error is again zero. These values are also stored. These result are shown in Table IV:

TABLE IV

| Set # | (Y, M, C, K) | (Y', M', C', K') | E |
|---|---|---|---|
| n | 76, 76, 76, 89 | 73, 72, 78, 90 | 0 |
| n + 1 | 76, 76, 102, 89 | (a) 73, 73, 100, 89 | 0.1 |
|  |  | (b) 73, 74, 100, 88 | 0 |
|  |  | (c) 71, 76, 100, 91 | 0 |
| n + 2 | 76, 76, 128, 89 | 73, 75, 131, 91 | 0 |
| n + 3 | 76, 76, 153, 89 | 73, 71, 152, 93 | 0 |

The question now becomes which set of values (Y', M', C', K')$_{n+1}$ should we keep in compiling our table 128 for the input set $(Y,M,C,K)_{n+1}$. Obviously set (a) is the worst match, and we can discard it. Of the other two, it is preferred to keep the set that will provide the most accurate interpolation results, when interpolation involving those values must be used. One way to do this is to select the set that has values best distributed between the preceding "n" set and the following "n+2" set. A way to make this selection is as follows. Let Table V represent the two possibilities of selection.

TABLE V

| Set # | Possibility #1 (Y', M', C', K') | Possibility #2 (Y', M', C', K') | Input (Y, M, C, K) |
|---|---|---|---|
| n | 73, 72, 78, 90 | 73, 72, 78, 90 | 76, 76, 76, 89 |
| n + 1 (b) | 73, 74, 100, 90 |  | 76, 76, 102, 89 |
| n + 1 (c) |  | 71, 76, 100, 88 | 76, 76, 102, 89 |
| n + 2 | 73, 75, 131, 91 | 73, 75, 131, 91 | 76, 76, 128, 89 |

We next compare the point spread deviation between input (Y,M,C,K) sets and the corresponding (Y',M',C',K) sets. For instance, comparing the inputs between sets n and n+1, we have: $Y_{n+1}-Y_n=0$, $M_{n+1}-M_n=0$, $C_{n+1}-C_n=26$, $K_{n+1}-K_n=0$ and comparing the inputs between sets n+1 and n+2, we have: $Y_{n+2}-Y_{n+1}=0$, $M_{n+2}-M_{n+1}=0$, $C_{n+2}-C_{n+1}=26$, $K_{n+2}-K_{n+1}=0$. Next, we do the same using the values for Y', M', C', K' from the first selection column (labelled "Possibility #1"), and we get: $Y'_{n+1}-Y'_n=0$, $M'_n=2$, $C'_{n+1}-C'_n=22$, $K'_{n+1}-K'_n=-1$. Thus, we see that for a zero change in the Y input values, there is a zero change in the Y' values. For zero change in the M input values, we have a change of +2 points in the M' value. For a 26 point change in the C value input, the C' value changes by 22 points, or a short fall of −4. And for a zero input change in the K value we have a −1 point change in the K'.

Similarly the differences observed between the n+2 and n+1 sets, yields a difference for Y=0 points, M=+1, C=+5 and K=+2.

We will refer to these differences in the values as the deviation from the ideal situation where the increments of change between input values are the same as the increments of change between corresponding values, that is where $(C_n-C_{n-1})=(C'_n-C'_{n-1})$. The average of the deviation magnitude $AD_n$ for the deviation between sets n and n+1 for Y', M', C', K' from Table V selection #1 column is $AD_1=7/4$ or 1.75; for sets n+1 and n+2, again for selection #1 the average is $AD_2=2$.

For values from column selection #2 in Table V, the same process yields $AD_3=2.75$ for sets n and n+1, and 2.25 for $AD_4$ for sets n+1 and n+2. Thus, after comparing the average deviations for the two selections, set n+1(b) in selection #1 is seen to yield set values that have magnitudes which, when taken as adjacent pairs of values with the preceding or following sets of values define color spans that on the average deviate less from the spans defined by the corresponding input color pairs than the values obtained from the sets of values from selection #2. Therefore, the set of (Y', M', C', K')$_{n+1(b)}$ values is used in the transform table compilation. If set (a) could not be discarded as obviously the worst match, it could be compared to sets (b) and (c) like set (b) was compared to set (c) above to determine which set is the best match.

Figure 9:
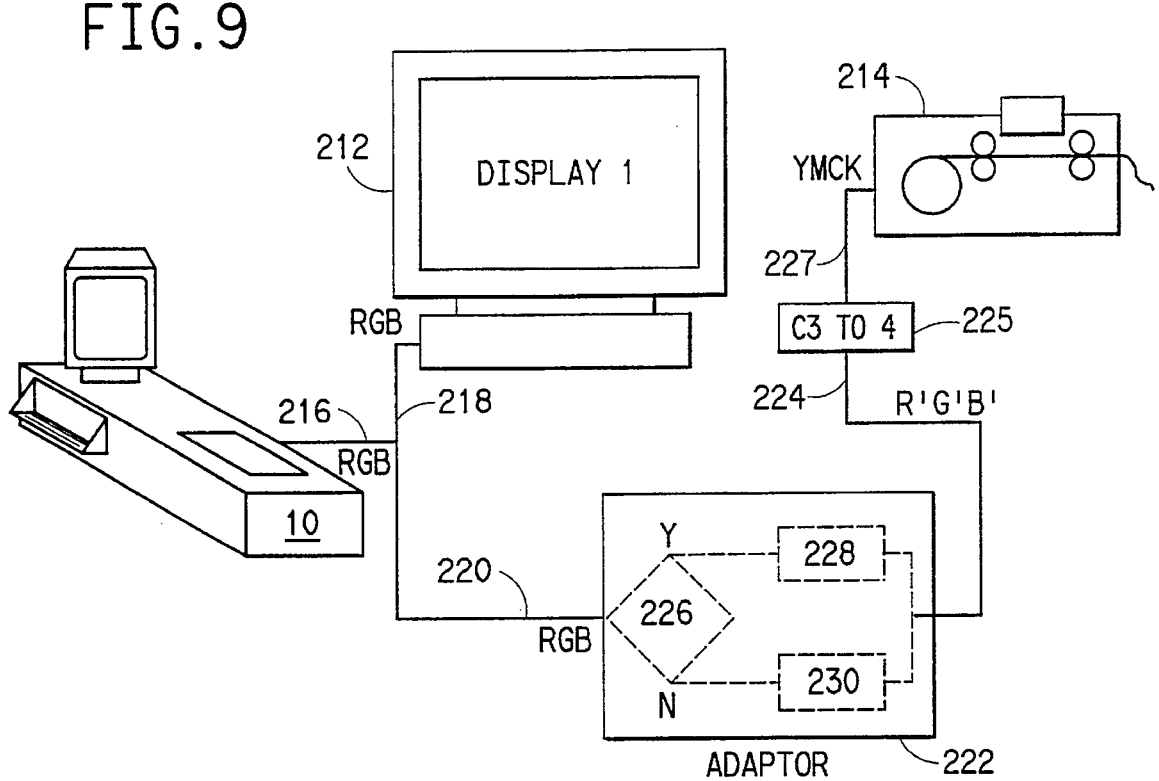
FIG. 9 is a schematic representation of an arrangement in accordance with this invention in which two matched images are printed using a CRT display and a printer including an RGB to CMYK converter.

FIG. 9 shows a situation where image color matching is desired in images produced with a color printer 214 which accepts RGB values (through a converter 225 that converts RGB inputs to YMCA using a mathematical relationship that the printer manufacturer has determined as an accurate color conversion) and a CRT monitor 212. For this arrangement, as shown in FIG. 9, the output of work station 10 is an RGB signal over line 216. It is used to drive the CRT display 212 directly and the color printer 214 through a 3 to 4 color conversion unit 225 which converts RGB inputs to YMCK outputs; an adaptor 222 comprising a transform LUT 228 constructed in accordance with this invention is placed ahead of conversion unit 225.

Figure 11:
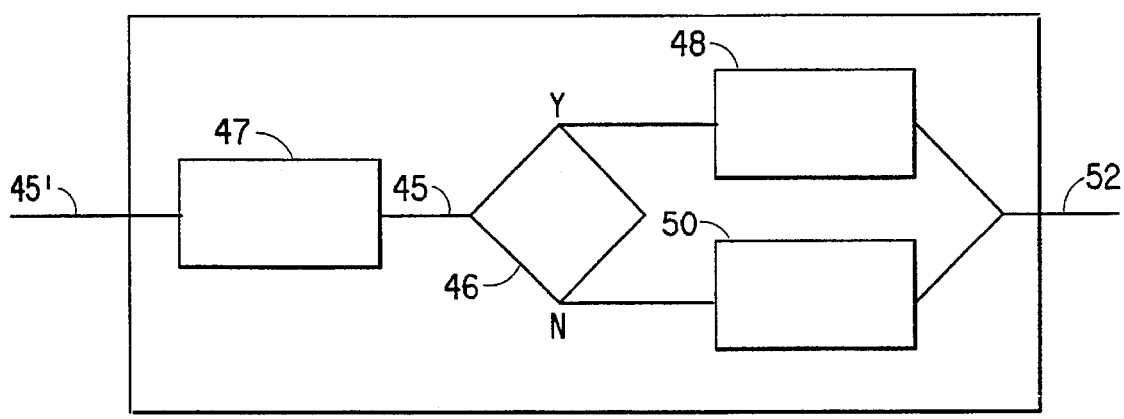
FIG. 11 is a generic representation of a display model for use in developing the transfer LUTs required for the embodiments shown in FIGS. 9 and 10.

This LUT 228 is compiled using a process similar to the process illustrated in FIG. 8. However, in generating the model 44 for the printer 214, the converter unit 225 is included with the color printer 214 as an integral part thereof. Thus, this model 44 which is schematically shown in generic format in FIG. 11 has an input 45' which leads to converter 47. The output of converter 47 over line 45 is directed to the input of a receiving and determining element 46 and therefrom in a similar arrangement to that shown in the generic model of FIG. 4 produces an output 52 either directly through LUT 48, or by interpolation through interpolator 50.

Figure 10:
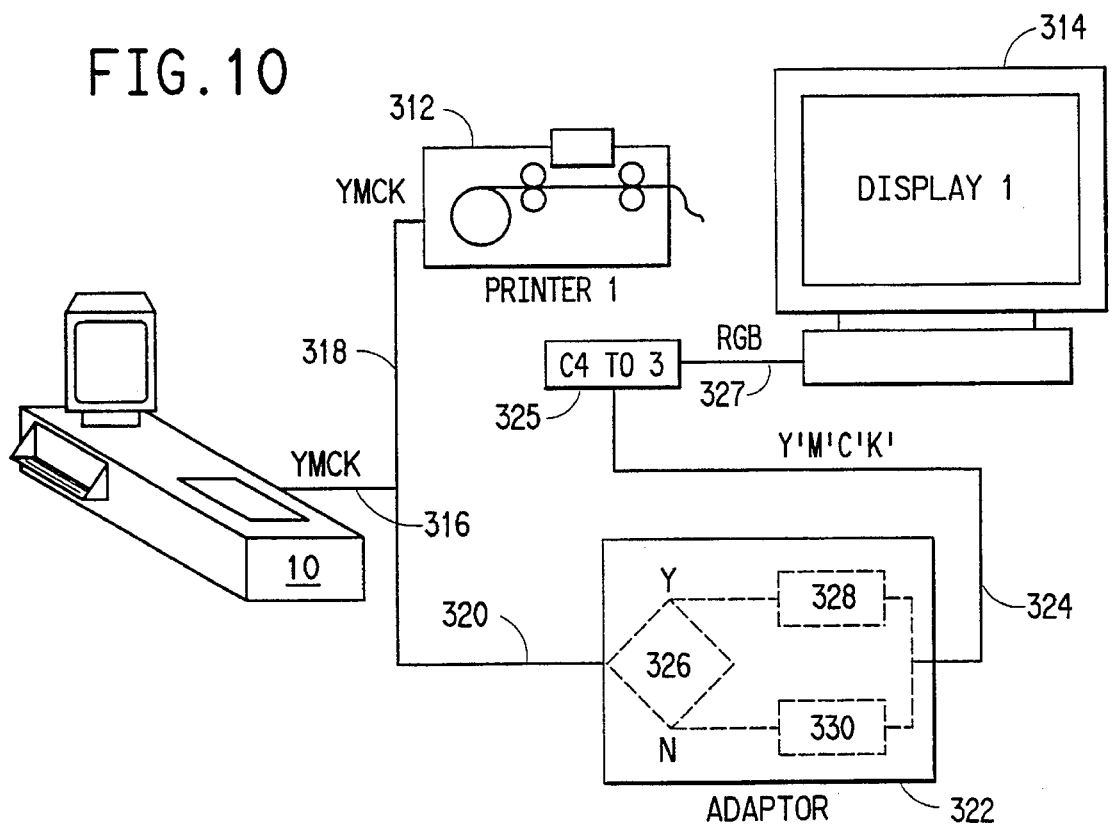
FIG. 10 is a schematic representation of an arrangement in accordance with this invention in which two matched images are printed using a CRT display and a color proofing device using a YMCK to RGB to drive the CRT display.

In the arrangement shown in FIG. 10, the output of the work station 10 is a YMCK signal which drives directly color proofer 312 over lines 316 and 318. The YMCK output is also used to display an image on a CRT monitor 314. This monitor 314 is able to accept YMCK input values because of a 4 to 3 color conversion that occurs in a color converter 325 prior to being used by the monitor 314. To obtain more accurate image color matching, an adaptor 322 which includes a receiving and determining element 326 and a transform LUT 328 for converting YMCK input values to Y'M'C'K' is placed ahead of the converter 325. As before an interpolator 330 is included in the adaptor to derive values not present in the LUT 328. The Y'M'C'K' values are directed to a CRT display 314 over line 324 through existing converter 325.

The transform LUT 328 is also generated using the process described earlier, wherein two models 44 are created representing the two display devices 312 and 314. The CRT display device model 314, however, as in the previous example, includes the 4 to 3 converter 325 and is also similar to the generic model illustrated in FIG. 11. The LUT 328 is again compiled using the process illustrated in FIG. 8. The transform LUT 328 converts input YMCK values to output Y'M'C'K' which when sent to converter 325 generate RGB values such that when displayed on the CRT display 314 will produce an image having the same or substantially the same color appearance as the image produced by the color proofer 312 using the original YMCK values directly.

In discussing this invention there has been constant reference to "interpolation". Interpolation leading to derived output sets of color image values based on input sets of image values is used in performing the process of this invention. It is evident that if interpolation is not used, the LUTs employed both in the models and in the adaptors must supply values for all possible combinations of input color values. In a digital system operating in an 8-bit domain, for a three variable system, i.e., RGB, the possible input value combinations are 256*256*256 or 16,777,216 combinations. To develop the necessary LUTs, each of these combinations would have to be printed as a patch, in accordance with this process, measured, compared, and optimized, clearly an impractical process because of the shear magnitude of numbers and calculations involved. Thus, limited numbers of sets are selected as illustrated in Tables I and II and interpolation is used for intermediate sets of input color values.

The particular interpolation process used may vary. Depending on the accuracy one wishes in the system more or less calculation intensive interpolations may be used. In practicing this invention, it is preferred that a less calculation intensive interpolation method is used in the model interpolators, while a more sophisticated method is used in the adaptor interpolators. Examples of both types are given below. However, any of the interpolation methods described herein below, as well as other interpolation formulae, such as quadratic interpolation, can be used for either the adaptor interpolators, or the model interpolators, the final choice being based on desired accuracy of the matching process, and the availability of resources. This invention is not restricted to the use of one interpolator for adaptors 22, 122, 222, 322 and a different one for the models 40, 42, 140 and 142 even though such arrangement is both used and preferred.

The preferred interpolation performed in interpolators 30, 130, 230 and 330 shown in the adaptors shown in FIGS. 1, 6, 9 and 10, respectively, that is the interpolator 30, 130, 230 or 330 that accompanies a transform LUT 28, 128, 228 or 328, respectively, is tetrahedral interpolation performed through a programmed computer. A pair of appropriate programs for programming such a computer to perform this interpolation for three and four variables are included with this application as Appendices "A" and "B" which appear immediately before the claims.

Linear interpolation, tri-linear or quadralinear depending on the particular color space in which the color values exist, is the preferred choice of interpolation in models 40, 42, 140 and 142 shown in FIGS. 3 and 8, used in deriving the transform LUTs 28, 128, 228, 328, as it is simpler, and often adequate to produce good results. The algorithm for this type of interpolation as applied in this invention is next explained for the more complex case of a four to three transform, i.e., from (YMCK) input values to (Lab) as would be used in models 140 or 142. The three to three (RGB color space) and four to four (YMCK color space) transform cases are similar.

The numerical values for Y,M,C,K given in Table II represent data points along a system of axes Y, M, C, and K. In the case of three variables, i.e., R,G,B color values, this may be an orthogonal axis system that may be easily visualized. With four variables visualization is very difficult, however, such actual visualization is not necessary to perform the interpolation.

The data points representing predetermined color values of a variable along the axis for this variable are separated by a specified number of units representing a distance measured along this axis. Thus, the data points Y=102 and Y=128 are separated by a distance of 26 units along the Y axis, while the data points M=128 and M=153 are separated by 25 units along the M axis. An input value may fall either on a data point, or between data points. When it falls on a data point the LUT provides a corresponding value. If the input value fall between data points, then an output is calculated as follows.

Let $F_i$ be the ratio of the distance of the input value from a preceding data point along an axis to the distance between that data point and the next consecutive data point along this axis. Thus, if the color value set has four components, (i=0, 1, 2, or 3, for the Y, M, C, K components) and $Y_n$ is a data point along the Y axis, Yn+1 is the next data point along this axis, and $Y_1$ is the Y component value of a color input set of values whose numerical value lies between $Y_n$ and $Y_{n+1}$, then: $F_i=(Y1-Y_n)/(Y_{n+1}-Y_n)$ for i=0.

We also define a quantity Qi=1-Fi, and the coefficients tj (where j=1, ... 16) as follows:

$t_1 = F_0*F_1*F_2*F_3$     $t_6 = Q_0*Q_1*F_2*F_3$     $t_{11} = F_0*F_1*Q_2*Q_3$ $t_2 = Q_0*F_1*F_2*F_3$     $t_7 = Q_0*F_1*Q_2*F_3$     $t_{12} = F_0*Q_1*Q_2*Q_3$ $t_3 = F_0*Q_1*F_2*F_3$     $t_8 = Q_0*F_1*F_2*Q_3$     $t_{13} = Q_0*F_1*Q_2*Q_3$ $t_4 = F_0*F_1*Q_2*F_3$     $t_9 = F_0*Q_1*Q_2*F_3$     $t_{14} = Q_0*Q_1*F_2*Q_3$ $t_5 = F_0*F_1*F_2*Q_3$     $t_{10} = F_0*Q_1*F_2*Q_3$    $t_{15} = Q_0*Q_1*Q_2*F_3$ $t_{16} = Q_0*Q_1*Q_2*Q_3$

Let $L_{(Yn,Mn,Cn,Kn)}$, $a_{(Yn,Mn,Cn,Kn)}$, $b_{(Yn,Mn,Cn,Kn)}$, represent the Lab values from the LUT for the model 140 for instance, for an input $Y_n, M_n, C_n, K_n$, $L_{(Yn+1,Mn,Cn,Kn)}$, $a_{(Yn+1,Mn,Cn,Kn)}$, $b_{(Yn+1,Mn,Cn,Kn)}$ the Lab values for an input $Y_{n+1}, M_n, C_n,$ and $K_n$, $L_{(Yn,Mn+1,Cn,Kn)}$, $a_{(Yn,Mn+1,Cn,Kn)}$, $b_{(Yn,Mn+1,Cn,Kn)}$, the values from the LUT for an input $Y_n, M_{n+1}, C_n$ and $K_n$, and so on for all 16 combinations of input values (Y, M, C, K)$_n$ and (Y, M, C, K)$_{n+1}$. The Lab values $L_1$, $a_1$, and $b_1$ for an input set of Y1,M1,C1,K1 color values falling between the n and n+1 sets of values in the LUT, are given by the following equations:

$L_1 = t_1 * L_{(Yn+1,Mn+1,Cn+1,Kn+1)} + t_2 * L_{(Yn,Mn+1,Cn+1,Kn+1)} +$ $t_3 * L_{(Yn+1,Mn,Cn+1,Kn+1)} + t_4 * L_{(Yn+1,Mn+1,Cn,Kn+1)} +$ $t_5 * L_{(Yn+1,Mn+1,Cn+1,Kn)} + t_6 * L_{(Yn,Mn,Cn+1,Kn+1)} +$ $t_7 * L_{(Yn,Mn+1,Cn,Kn+1)} + t_8 * L_{(Yn,Mn+1,Cn+1,Kn)} +$ $t_9 * L_{(Yn+1,Mn,Cn,Kn+1)} + t_{10} * L_{(Yn+1,Mn,Cn+1,Kn)} +$ $t_{11} * L_{(Yn+1,Mn+1,Cn,Kn)} + t_{12} * L_{(Yn+1,Mn,Cn,Kn)} +$ $t_{13} * L_{(Yn,Mn+1,Cn,Kn)} + t_{14} * L_{(Yn,Mn,Cn+1,Kn)} +$ $t_{15} * L_{(Yn,Mn,Cn,Kn+1)} + t_{16} * L_{(Yn,Mn,Cn,Kn)}.$

Similarly, $a_1 = t_1 * a_{(Yn+1,Mn+1,Cn+1,Kn+1)} + t_2 * a_{(Yn,Mn+1,Cn+1,Kn+1)} +$ $t_3 * a_{(Yn+1,Mn,Cn+1,Kn+1)} + t_4 * a_{(Yn+1,Mn+1,Cn,Kn+1)} +$ $t_5 * a_{(Yn+1,Mn+1,Cn+1,Kn)} + t_6 * a_{(Yn,Mn,Cn+1,Kn+1)} +$ $t_7 * a_{(Yn,Mn+1,Cn,Kn+1)} + t_8 * a_{(Yn,Mn+1,Cn+1,Kn)} +$ $t_9 * a_{(Yn+1,Mn,Cn,Kn+1)} + t_{10} * a_{(Yn+1,Mn,Cn+1,Kn)} +$ $t_{11} * a_{(Yn+1,Mn+1,Cn,Kn)} + t_{12} * a_{(Yn+1,Mn,Cn,Kn)} +$ $t_{13} * a_{(Yn,Mn+1,Cn,Kn)} + t_{14} * a_{(Yn,Mn,Cn+1,Kn)} +$ $t_{15} * a_{(Yn,Mn,Cn,Kn+1)} + t_{16} * a_{(Yn,Mn,Cn,Kn)}.$ And, $b_1 = t_1 * b_{(Yn+1,Mn+1,Cn+1,Kn+1)} + t_2 * b_{(Yn,Mn+1,Cn+1,Kn+1)} +$ $t_3 * b_{(Yn+1,Mn,Cn+1,Kn+1)} + t_4 * b_{(Yn+1,Mn+1,Cn,Kn+1)} +$ $t_5 * b_{(Yn+1,Mn+1,Cn+1,Kn)} + t_6 * b_{(Yn,Mn,Cn+1,Kn+1)} +$ $t_7 * b_{(Yn,Mn+1,Cn,Kn+1)} + t_8 * b_{(Yn,Mn+1,Cn+1,Kn)} +$ $t_9 * b_{(Yn+1,Mn,Cn,Kn+1)} + t_{10} * b_{(Yn+1,Mn,Cn+1,Kn)} +$ $t_{11} * b_{(Yn+1,Mn+1,Cn,Kn)} + t_{12} * b_{(Yn+1,Mn,Cn,Kn)} +$ $t_{13} * b_{(Yn,Mn+1,Cn,Kn)} + t_{14} * b_{(Yn,Mn,Cn+1,Kn)} +$ $t_{15} * b_{(Yn,Mn,Cn,Kn+1)} + t_{16} * b_{(Yn,Mn,Cn,Kn)}.$ Those skilled in the art, having the benefit of the teachings of the present invention as herein above set forth, can effect numerous modifications thereto. These modifications are to be construed as being encompassed within the scope of the present invention as set forth in the appended claims.

APPENDIX A

```
/****************************************************************

(c) Copyright 1992
            E. I. DuPont de Nemours and Company (Inc.)
                Wilmington, Delaware 19898.

Module:       tr3us_t.c

Purpose:      A function for tetrahedral type highspeed interpolation
               for performing 3 to 3 or 3 to n color coordinate
               conversions for the case of uniform sampling along
               coordinate axes. The vertices of the cube are
               numbered sequentially in a natural binary order
               (x3 x2 x1).

Author:       C. B. Chittineni

Date Create:  June 1, 1992

Usage:        tr3us_t(n,ns,x1,x2,x3,l,x,y,z,val)

where   n  - no of outputs(int short)
           ns - total number of data sample points per output(int short)
           x1 - data point with in the cube along x1 axis(int short)
           x2 - data point with in the cube along x2 axis(int short)
           x3 - data point with in the cube along x3 axis(int short)
           l  - length of cube(int short)
           x  - data vector at current node(least rapidly varying)
                (unsigned char)
           y  - data vector at current node(second least rapidly
                varying) (unsigned char)
           z  - data vector at current node(most rapidly varying)
                (unsigned char)
           val- pointer to interpolated values(n)(int short)

Modification:(Chittineni: July 9, 1992)Changed the vertex numbering
              as (n) -> (x y z)(0 - 1 1 1, 1 - 0 1 1, 2 - 1 0 1,
              3 - 0 0 1, 4 - 1 1 0, 5 - 0 1 0, 6 - 1 0 0,
              7 - 0 0 0)(Liang's data files format).

****************************************************************/ tr3us_t(n, ns, x1, x2, x3, l, x, y, z, new)
short new[3], n, ns, x1, x2, x3, l;
unsigned char *x, *y, *z;
{ int short w0, w1, w2, w3, a, b, c, d;
    int itm, j, j1, dt;
    int j2, j3, j4;
    unsigned char *x0, *y0, *z0;

itm=0;
    if(x2 >= x1){
        if(x3 >= x2){
            itm=3;
        }else if(x3 >= x1){
                itm=5;
                }else{
                    itm=4;
                }
    }else if(x2>=x3){
```

```
64              itm=0;
65          }else if(x3 >= x1){
66                  itm=2;
67          }else{
68                  itm=1;
69          }
70
71      switch (itm) {
72
73          case 0:
74              w0=(1-x1); w1=(x1-x2); w2=(x2-x3); w3=x3;
75              new[0]=(w0*x[7]+w1*x[3]+w2*x[1]+w3*x[0])/1;
76              new[1]=(w0*y[7]+w1*y[3]+w2*y[1]+w3*y[0])/1;
77              new[2]=(w0*z[7]+w1*z[3]+w2*z[1]+w3*z[0])/1;
78              break;
79
80          case 1:
81              w0=(1-x1); w1=(x1-x3); w2=(x3-x2); w3=x2;
82              new[0]=(w0*x[7]+w1*x[3]+w2*x[2]+w3*x[0])/1;
83              new[1]=(w0*y[7]+w1*y[3]+w2*y[2]+w3*y[0])/1;
84              new[2]=(w0*z[7]+w1*z[3]+w2*z[2]+w3*z[0])/1;
85              break;
86
87          case 2:
88              w0=(1-x3); w1=(x3-x1); w2=(x1-x2); w3=x2;
89              new[0]=(w0*x[7]+w1*x[6]+w2*x[2]+w3*x[0])/1;
90              new[1]=(w0*y[7]+w1*y[6]+w2*y[2]+w3*y[0])/1;
91              new[2]=(w0*z[7]+w1*z[6]+w2*z[2]+w3*z[0])/1;
92              break;
93
94          case 3:
95              w0=(1-x3); w1=(x3-x2); w2=(x2-x1); w3=x1;
96              new[0]=(w0*x[7]+w1*x[6]+w2*x[4]+w3*x[0])/1;
97              new[1]=(w0*y[7]+w1*y[6]+w2*y[4]+w3*y[0])/1;
98              new[2]=(w0*z[7]+w1*z[6]+w2*z[4]+w3*z[0])/1;
99              break;
100
101         case 4:
102             w0=(1-x2); w1=(x2-x1); w2=(x1-x3); w3=x3;
103             new[0]=(w0*x[7]+w1*x[5]+w2*x[1]+w3*x[0])/1;
104             new[1]=(w0*y[7]+w1*y[5]+w2*y[1]+w3*y[0])/1;
105             new[2]=(w0*z[7]+w1*z[5]+w2*z[1]+w3*z[0])/1;
106             break;
107
108         case 5:
109             w0=(1-x2); w1=(x2-x3); w2=(x3-x1); w3=x1;
110             new[0]=(w0*x[7]+w1*x[5]+w2*x[4]+w3*x[0])/1;
111             new[1]=(w0*y[7]+w1*y[5]+w2*y[4]+w3*y[0])/1;
112             new[2]=(w0*z[7]+w1*z[5]+w2*z[4]+w3*z[0])/1;
113             break;
114
115         }
116         return;
117     }
```

APPENDIX B

```
/*******************************************************************

(c) Copyright 1992
               E. I. DuPont de Nemours and Company (Inc.)
                  Wilmington, Delaware 19898.

Module:       tr4us_t.c

Purpose:      A function for tetrahedral type highspeed interpolation
                 for performing 4 to 4 or 4 to n color coordinate
                 conversions for the case of uniform sampling along
                 coordinate axes. The vertices of the hypercube are
                 numbered sequentially in a binary order (x1 x2 x3 x4).
                 It is to be noted that the ordering is important
                 in arranging the sampled data and in passing the
                 arguments to the function.

Author:       C. B. Chittineni

Date Create:  June 1, 1992

Usage:        tr4us_t(n,ns,x1,x2,x3,x4,l,cbl,mbl,ybl,kbl,val)

where   n  - no of outputs(int short)
              ns - total number of data sample points per output(int)
              x1 - data point with in the hypercube along x1 axis(int short)
              x2 - data point with in the hypercube along x2 axis(int short)
              x3 - data point with in the hypercube along x3 axis(int short)
              x4 - data point with in the hypercube along x4 axis(int short)
              l  - length of hypercube(int short)
              cbl- data vector at current node(least rapidly varying)
                   (unsigned char)
              mbl- data vector at current node(second least rapidly varying)
                   (unsigned char)
              ybl- data vector at current node(third least rapidly varying)
                   (unsigned char)
              kbl- data vector at current node(most rapidly varying)
                   (unsigned char)
              val- pointer to interpolated values(n)(int short)

Modification:(Chittineni:July 9, 1992)Changed the vertex numbering
                as (n) -> (cbl mbl ybl kbl)(0 - 1 1 1 1, 1 - 0 1 1 1,
                2 - 1 0 1 1, 3 - 1 1 0 1, 4 - 1 1 1 0, 5 - 0 0 1 1,
                6 - 0 1 0 1, 7 - 0 1 1 0, 8 - 1 0 0 1, 9 - 1 0 1 0,
                10- 1 1 0 0,11 - 1 0 0 0,12 - 0 1 0 0,13 - 0 0 1 0,
                14- 0 0 0 1,15 - 0 0 0 0)(Liang's data format).

*******************************************************************/ include <stdio.h>
include <math.h>
tr4us_t(n, ns, x1, x2, x3, x4, l, cbl, mbl, ybl, kbl, new)
int short n, x1, x2, x3, x4, l;
int short *new;
int ns;
unsigned char *cbl, *mbl, *ybl, *kbl;
{ int short w0, w1, w2, w3, w4, a, b, c, d, e;
    int itm, j, j1, j2;

/* Locate the tetrahedran */
    if(x1 >= x2){
```

```
64            if(x2 >= x3){
65                if(x3 >= x4){
66                    itm=1;
67                }else if(x1 >= x4){
68                        if(x2 >= x4){
69                            itm=2;
70                        }else{
71                            itm=3;
72                        }
73                }else {
74                    itm=19;
75                }
76            }else if(x3 >= x4){
77                    if(x1>=x4){
78                        if(x2>=x4){
79                            if(x1>=x3){
80                                itm=5;
81                            }else{
82                                itm=13;
83                            }
84                        }else if(x1 >= x3){
85                                itm=6;
86                            }else{
87                                itm=14;
88                            }
89                    }else{
90                        itm=15;
91                    }
92                }else if(x1 >= x4){
93                        itm=4;
94                    }else if(x1 >= x3){
95                        itm=20;
96                    }else {
97                        itm=21;
98                    }
99            }else if(x2 >= x3){
100                if(x3 >= x4){
101                    if(x1 >= x4){
102                        if(x1 >= x3){
103                            itm=7;
104                        }else {
105                            itm=11;
106                        }
107                    }else{
108                        itm=12;
109                    }
110                }else if(x1 >= x4){
111                        itm=8;
112                    }else if(x2 >= x4){
113                            if(x1 >= x3){
114                                itm=9;
115                            }else{
116                                itm=10;
117                            }
118                        }else if(x1 >= x3){
119                                itm=23;
120                            }else{
121                                itm=24;
122                            }
123            }else if(x3 >= x4){
124                    if(x1 >= x4){
125                        itm=17;
126                    }else if(x2 >= x4){
```

```
127                                      itm=18;
128                              }else{
129                                      itm=16;
130                              }
131                      }else{
132                              itm=22;
133                      }
134
135 /*              fprintf(stderr, "%d \n", itm);*/
136
137         switch (itm) {
138
139           case 1:
140               w0=(1-x1); w1=(x1-x2); w2=(x2-x3); w3=(x3-x4); w4=x4;
141               new[0]=(w0*cbl[15]+w1*cbl[11]+w2*cbl[10]+w3*cbl[4]+w4*cbl[0])/l;
142               new[1]=(w0*mbl[15]+w1*mbl[11]+w2*mbl[10]+w3*mbl[4]+w4*mbl[0])/l;
143               new[2]=(w0*ybl[15]+w1*ybl[11]+w2*ybl[10]+w3*ybl[4]+w4*ybl[0])/l;
144               new[3]=(w0*kbl[15]+w1*kbl[11]+w2*kbl[10]+w3*kbl[4]+w4*kbl[0])/l;
145               break;
146
147           case 2:
148               w0=(1-x1); w1=(x1-x2); w2=(x2-x4); w3=(x4-x3); w4=x3;
149               new[0]=(w0*cbl[15]+w1*cbl[11]+w2*cbl[10]+w3*cbl[3]+w4*cbl[0])/l;
150               new[1]=(w0*mbl[15]+w1*mbl[11]+w2*mbl[10]+w3*mbl[3]+w4*mbl[0])/l;
151               new[2]=(w0*ybl[15]+w1*ybl[11]+w2*ybl[10]+w3*ybl[3]+w4*ybl[0])/l;
152               new[3]=(w0*kbl[15]+w1*kbl[11]+w2*kbl[10]+w3*kbl[3]+w4*kbl[0])/l;
153               break;
154
155           case 3:
156               w0=(1-x1); w1=(x1-x4); w2=(x4-x2); w3=(x2-x3); w4=x3;
157               new[0]=(w0*cbl[15]+w1*cbl[11]+w2*cbl[8]+w3*cbl[3]+w4*cbl[0])/l;
158               new[1]=(w0*mbl[15]+w1*mbl[11]+w2*mbl[8]+w3*mbl[3]+w4*mbl[0])/l;
159               new[2]=(w0*ybl[15]+w1*ybl[11]+w2*ybl[8]+w3*ybl[3]+w4*ybl[0])/l;
160               new[3]=(w0*kbl[15]+w1*kbl[11]+w2*kbl[8]+w3*kbl[3]+w4*kbl[0])/l;
161               break;
162
163           case 4:
164               w0=(1-x1); w1=(x1-x4); w2=(x4-x3); w3=(x3-x2); w4=x2;
165               new[0]=(w0*cbl[15]+w1*cbl[11]+w2*cbl[8]+w3*cbl[2]+w4*cbl[0])/l;
166               new[1]=(w0*mbl[15]+w1*mbl[11]+w2*mbl[8]+w3*mbl[2]+w4*mbl[0])/l;
167               new[2]=(w0*ybl[15]+w1*ybl[11]+w2*ybl[8]+w3*ybl[2]+w4*ybl[0])/l;
168               new[3]=(w0*kbl[15]+w1*kbl[11]+w2*kbl[8]+w3*kbl[2]+w4*kbl[0])/l;
169               break;
170
171           case 5:
172               w0=(1-x1); w1=(x1-x3); w2=(x3-x2); w3=(x2-x4); w4=x4;
173               new[0]=(w0*cbl[15]+w1*cbl[11]+w2*cbl[9]+w3*cbl[4]+w4*cbl[0])/l;
174               new[1]=(w0*mbl[15]+w1*mbl[11]+w2*mbl[9]+w3*mbl[4]+w4*mbl[0])/l;
175               new[2]=(w0*ybl[15]+w1*ybl[11]+w2*ybl[9]+w3*ybl[4]+w4*ybl[0])/l;
176               new[3]=(w0*kbl[15]+w1*kbl[11]+w2*kbl[9]+w3*kbl[4]+w4*kbl[0])/l;
177               break;
178
179           case 6:
180               w0=(1-x1); w1=(x1-x3); w2=(x3-x4); w3=(x4-x2); w4=x2;
181               new[0]=(w0*cbl[15]+w1*cbl[11]+w2*cbl[9]+w3*cbl[2]+w4*cbl[0])/l;
182               new[1]=(w0*mbl[15]+w1*mbl[11]+w2*mbl[9]+w3*mbl[2]+w4*mbl[0])/l;
183               new[2]=(w0*ybl[15]+w1*ybl[11]+w2*ybl[9]+w3*ybl[2]+w4*ybl[0])/l;
184               new[3]=(w0*kbl[15]+w1*kbl[11]+w2*kbl[9]+w3*kbl[2]+w4*kbl[0])/l;
185               break;
186
187           case 7:
188               w0=(1-x2); w1=(x2-x1); w2=(x1-x3); w3=(x3-x4); w4=x4;
189               new[0]=(w0*cbl[15]+w1*cbl[12]+w2*cbl[10]+w3*cbl[4]+w4*cbl[0])/l;
```

```
190         new[1]=(w0*mbl[15]+w1*mbl[12]+w2*mbl[10]+w3*mbl[4]+w4*mbl[0])/l;
191         new[2]=(w0*ybl[15]+w1*ybl[12]+w2*ybl[10]+w3*ybl[4]+w4*ybl[0])/l;
192         new[3]=(w0*kbl[15]+w1*kbl[12]+w2*kbl[10]+w3*kbl[4]+w4*kbl[0])/l;
193         break;
194
195     case 8:
196         w0=(1-x2); w1=(x2-x1); w2=(x1-x4); w3=(x4-x3); w4=x3;
197         new[0]=(w0*cbl[15]+w1*cbl[12]+w2*cbl[10]+w3*cbl[3]+w4*cbl[0])/l;
198         new[1]=(w0*mbl[15]+w1*mbl[12]+w2*mbl[10]+w3*mbl[3]+w4*mbl[0])/l;
199         new[2]=(w0*ybl[15]+w1*ybl[12]+w2*ybl[10]+w3*ybl[3]+w4*ybl[0])/l;
200         new[3]=(w0*kbl[15]+w1*kbl[12]+w2*kbl[10]+w3*kbl[3]+w4*kbl[0])/l;
201         break;
202
203     case 9:
204         w0=(1-x2); w1=(x2-x4); w2=(x4-x1); w3=(x1-x3); w4=x3;
205         new[0]=(w0*cbl[15]+w1*cbl[12]+w2*cbl[6]+w3*cbl[3]+w4*cbl[0])/l;
206         new[1]=(w0*mbl[15]+w1*mbl[12]+w2*mbl[6]+w3*mbl[3]+w4*mbl[0])/l;
207         new[2]=(w0*ybl[15]+w1*ybl[12]+w2*ybl[6]+w3*ybl[3]+w4*ybl[0])/l;
208         new[3]=(w0*kbl[15]+w1*kbl[12]+w2*kbl[6]+w3*kbl[3]+w4*kbl[0])/l;
209         break;
210
211     case 10:
212         w0=(1-x2); w1=(x2-x4); w2=(x4-x3); w3=(x3-x1); w4=x1;
213         new[0]=(w0*cbl[15]+w1*cbl[12]+w2*cbl[6]+w3*cbl[1]+w4*cbl[0])/l;
214         new[1]=(w0*mbl[15]+w1*mbl[12]+w2*mbl[6]+w3*mbl[1]+w4*mbl[0])/l;
215         new[2]=(w0*ybl[15]+w1*ybl[12]+w2*ybl[6]+w3*ybl[1]+w4*ybl[0])/l;
216         new[3]=(w0*kbl[15]+w1*kbl[12]+w2*kbl[6]+w3*kbl[1]+w4*kbl[0])/l;
217         break;
218
219     case 11:
220         w0=(1-x2); w1=(x2-x3); w2=(x3-x1); w3=(x1-x4); w4=x4;
221         new[0]=(w0*cbl[15]+w1*cbl[12]+w2*cbl[7]+w3*cbl[4]+w4*cbl[0])/l;
222         new[1]=(w0*mbl[15]+w1*mbl[12]+w2*mbl[7]+w3*mbl[4]+w4*mbl[0])/l;
223         new[2]=(w0*ybl[15]+w1*ybl[12]+w2*ybl[7]+w3*ybl[4]+w4*ybl[0])/l;
224         new[3]=(w0*kbl[15]+w1*kbl[12]+w2*kbl[7]+w3*kbl[4]+w4*kbl[0])/l;
225         break;
226
227     case 12:
228         w0=(1-x2); w1=(x2-x3); w2=(x3-x4); w3=(x4-x1); w4=x1;
229         new[0]=(w0*cbl[15]+w1*cbl[12]+w2*cbl[7]+w3*cbl[1]+w4*cbl[0])/l;
230         new[1]=(w0*mbl[15]+w1*mbl[12]+w2*mbl[7]+w3*mbl[1]+w4*mbl[0])/l;
231         new[2]=(w0*ybl[15]+w1*ybl[12]+w2*ybl[7]+w3*ybl[1]+w4*ybl[0])/l;
232         new[3]=(w0*kbl[15]+w1*kbl[12]+w2*kbl[7]+w3*kbl[1]+w4*kbl[0])/l;
233         break;
234
235     case 13:
236         w0=(1-x3); w1=(x3-x1); w2=(x1-x2); w3=(x2-x4); w4=x4;
237         new[0]=(w0*cbl[15]+w1*cbl[13]+w2*cbl[9]+w3*cbl[4]+w4*cbl[0])/l;
238         new[1]=(w0*mbl[15]+w1*mbl[13]+w2*mbl[9]+w3*mbl[4]+w4*mbl[0])/l;
239         new[2]=(w0*ybl[15]+w1*ybl[13]+w2*ybl[9]+w3*ybl[4]+w4*ybl[0])/l;
240         new[3]=(w0*kbl[15]+w1*kbl[13]+w2*kbl[9]+w3*kbl[4]+w4*kbl[0])/l;
241         break;
242
243     case 14:
244         w0=(1-x3); w1=(x3-x1); w2=(x1-x4); w3=(x4-x2); w4=x2;
245         new[0]=(w0*cbl[15]+w1*cbl[13]+w2*cbl[9]+w3*cbl[2]+w4*cbl[0])/l;
246         new[1]=(w0*mbl[15]+w1*mbl[13]+w2*mbl[9]+w3*mbl[2]+w4*mbl[0])/l;
247         new[2]=(w0*ybl[15]+w1*ybl[13]+w2*ybl[9]+w3*ybl[2]+w4*ybl[0])/l;
248         new[3]=(w0*kbl[15]+w1*kbl[13]+w2*kbl[9]+w3*kbl[2]+w4*kbl[0])/l;
249         break;
250
251     case 15:
252         w0=(1-x3); w1=(x3-x4); w2=(x4-x1); w3=(x1-x2); w4=x2;
```

```
253            new[0]=(w0*cbl[15]+w1*cbl[13]+w2*cbl[5]+w3*cbl[2]+w4*cbl[0])/l;
254            new[1]=(w0*mbl[15]+w1*mbl[13]+w2*mbl[5]+w3*mbl[2]+w4*mbl[0])/l;
255            new[2]=(w0*ybl[15]+w1*ybl[13]+w2*ybl[5]+w3*ybl[2]+w4*ybl[0])/l;
256            new[3]=(w0*kbl[15]+w1*kbl[13]+w2*kbl[5]+w3*kbl[2]+w4*kbl[0])/l;
257            break;
258
259        case 16:
260            w0=(1-x3); w1=(x3-x4); w2=(x4-x2); w3=(x2-x1); w4=x1;
261            new[0]=(w0*cbl[15]+w1*cbl[13]+w2*cbl[5]+w3*cbl[1]+w4*cbl[0])/l;
262            new[1]=(w0*mbl[15]+w1*mbl[13]+w2*mbl[5]+w3*mbl[1]+w4*mbl[0])/l;
263            new[2]=(w0*ybl[15]+w1*ybl[13]+w2*ybl[5]+w3*ybl[1]+w4*ybl[0])/l;
264            new[3]=(w0*kbl[15]+w1*kbl[13]+w2*kbl[5]+w3*kbl[1]+w4*kbl[0])/l;
265            break;
266
267        case 17:
268            w0=(1-x3); w1=(x3-x2); w2=(x2-x1); w3=(x1-x4); w4=x4;
269            new[0]=(w0*cbl[15]+w1*cbl[13]+w2*cbl[7]+w3*cbl[4]+w4*cbl[0])/l;
270            new[1]=(w0*mbl[15]+w1*mbl[13]+w2*mbl[7]+w3*mbl[4]+w4*mbl[0])/l;
271            new[2]=(w0*ybl[15]+w1*ybl[13]+w2*ybl[7]+w3*ybl[4]+w4*ybl[0])/l;
272            new[3]=(w0*kbl[15]+w1*kbl[13]+w2*kbl[7]+w3*kbl[4]+w4*kbl[0])/l;
273            break;
274
275        case 18:
276            w0=(1-x3); w1=(x3-x2); w2=(x2-x4); w3=(x4-x1); w4=x1;
277            new[0]=(w0*cbl[15]+w1*cbl[13]+w2*cbl[7]+w3*cbl[1]+w4*cbl[0])/l;
278            new[1]=(w0*mbl[15]+w1*mbl[13]+w2*mbl[7]+w3*mbl[1]+w4*mbl[0])/l;
279            new[2]=(w0*ybl[15]+w1*ybl[13]+w2*ybl[7]+w3*ybl[1]+w4*ybl[0])/l;
280            new[3]=(w0*kbl[15]+w1*kbl[13]+w2*kbl[7]+w3*kbl[1]+w4*kbl[0])/l;
281            break;
282
283        case 19:
284            w0=(1-x4); w1=(x4-x1); w2=(x1-x2); w3=(x2-x3); w4=x3;
285            new[0]=(w0*cbl[15]+w1*cbl[14]+w2*cbl[8]+w3*cbl[3]+w4*cbl[0])/l;
286            new[1]=(w0*mbl[15]+w1*mbl[14]+w2*mbl[8]+w3*mbl[3]+w4*mbl[0])/l;
287            new[2]=(w0*ybl[15]+w1*ybl[14]+w2*ybl[8]+w3*ybl[3]+w4*ybl[0])/l;
288            new[3]=(w0*kbl[15]+w1*kbl[14]+w2*kbl[8]+w3*kbl[3]+w4*kbl[0])/l;
289            break;
290
291        case 20:
292            w0=(1-x4); w1=(x4-x1); w2=(x1-x3); w3=(x3-x2); w4=x2;
293            new[0]=(w0*cbl[15]+w1*cbl[14]+w2*cbl[8]+w3*cbl[2]+w4*cbl[0])/l;
294            new[1]=(w0*mbl[15]+w1*mbl[14]+w2*mbl[8]+w3*mbl[2]+w4*mbl[0])/l;
295            new[2]=(w0*ybl[15]+w1*ybl[14]+w2*ybl[8]+w3*ybl[2]+w4*ybl[0])/l;
296            new[3]=(w0*kbl[15]+w1*kbl[14]+w2*kbl[8]+w3*kbl[2]+w4*kbl[0])/l;
297            break;
298
299        case 21:
300            w0=(1-x4); w1=(x4-x3); w2=(x3-x1); w3=(x1-x2); w4=x2;
301            new[0]=(w0*cbl[15]+w1*cbl[14]+w2*cbl[5]+w3*cbl[2]+w4*cbl[0])/l;
302            new[1]=(w0*mbl[15]+w1*mbl[14]+w2*mbl[5]+w3*mbl[2]+w4*mbl[0])/l;
303            new[2]=(w0*ybl[15]+w1*ybl[14]+w2*ybl[5]+w3*ybl[2]+w4*ybl[0])/l;
304            new[3]=(w0*kbl[15]+w1*kbl[14]+w2*kbl[5]+w3*kbl[2]+w4*kbl[0])/l;
305            break;
306
307        case 22:
308            w0=(1-x4); w1=(x4-x3); w2=(x3-x2); w3=(x2-x1); w4=x1;
309            new[0]=(w0*cbl[15]+w1*cbl[14]+w2*cbl[5]+w3*cbl[1]+w4*cbl[0])/l;
310            new[1]=(w0*mbl[15]+w1*mbl[14]+w2*mbl[5]+w3*mbl[1]+w4*mbl[0])/l;
311            new[2]=(w0*ybl[15]+w1*ybl[14]+w2*ybl[5]+w3*ybl[1]+w4*ybl[0])/l;
312            new[3]=(w0*kbl[15]+w1*kbl[14]+w2*kbl[5]+w3*kbl[1]+w4*kbl[0])/l;
313            break;
314
315        case 23:
```

```
316         w0=(1-x4); w1=(x4-x2); w2=(x2-x1); w3=(x1-x3); w4=x3;
317         new[0]=(w0*cbl[15]+w1*cbl[14]+w2*cbl[6]+w3*cbl[3]+w4*cbl[0])/l;
318         new[1]=(w0*mbl[15]+w1*mbl[14]+w2*mbl[6]+w3*mbl[3]+w4*mbl[0])/l;
319         new[2]=(w0*ybl[15]+w1*ybl[14]+w2*ybl[6]+w3*ybl[3]+w4*ybl[0])/l;
320         new[3]=(w0*kbl[15]+w1*kbl[14]+w2*kbl[6]+w3*kbl[3]+w4*kbl[0])/l;
321         break;
322
323     case 24:
324         w0=(1-x4); w1=(x4-x2); w2=(x2-x3); w3=(x3-x1); w4=x1;
325         new[0]=(w0*cbl[15]+w1*cbl[14]+w2*cbl[6]+w3*cbl[1]+w4*cbl[0])/l;
326         new[1]=(w0*mbl[15]+w1*mbl[14]+w2*mbl[6]+w3*mbl[1]+w4*mbl[0])/l;
327         new[2]=(w0*ybl[15]+w1*ybl[14]+w2*ybl[6]+w3*ybl[1]+w4*ybl[0])/l;
328         new[3]=(w0*kbl[15]+w1*kbl[14]+w2*kbl[6]+w3*kbl[1]+w4*kbl[0])/l;
329         break;
330
331     }
332
333     return;
334
335 }
```

What is claimed is:

1. A method for matching the color input signals of at least a first display device and at least a second display device, the first and second display devices having an input, comprising:

(I) creating a transform LUT for converting input color values to output color values by:

(1) producing a first preselected plurality of input color values;

(2) using said plurality of input values to display a plurality of color patches in said first and said second display devices;

(3) obtaining a colorimetric value of each of the displayed color patches in each of the display devices and using said colorimetric values to create a first and a second model for the first and second devices respectively correlating preselected input color values to displayed colorimetric values for each of the two devices;

(4) inputting to said first and second models a second preselected plurality of color values;

(5) comparing an output value signal received from the first model to an output value signal received from the second model to obtain an error signal indicative of the difference between the two output value signals from each of said second plurality of color values;

(6) using the error signal to modify the input color values to the second model and again comparing the output value signal received from the first model to the output value signal received from the second model to obtain a new error signal;

(7) repeating the process of steps (5) and (6) above until the error signal is a minimum; and (8) using the modified color values obtaining at the minimum error signal to create the transform LUT correlating input values to the modified color values;

(II) displaying a plurality of source color image values on said first display device;

(III) using the transform LUT to transform the plurality of source color image values to corresponding new image values before inputting said new image values to the input of the second display device; and (IV) displaying said new color image values on said second display device producing a colorimetric match with the source color image values displayed on the first display device.

2. The method according to claim 1, wherein in performing the step II, first testing every one of the plurality of source color image values; and second (a) if the source color image values are included in the LUT obtaining from the LUT, new image values corresponding to the source color image values; and (b) if the source color image values are not included in the LUT, then obtaining by interpolation from adjacent source image values in the LUT new image values corresponding to the source image values.

3. The method according to claim 1 or 2, wherein between steps (I)(7) and (I)(8) there is the additional step of optimizing the minimum error.

4. The method according to claim 1 or 2, wherein prior to step (I)(5), the gamut of the output color values of the first model is adjusted to be commensurate with the color values gamut of the second model.

5. The method according to claim 2, wherein the source color image values are RGB values and the display devices are CRT displays.

6. The method according to claim 2, wherein the source color image values are YMCK values and the display devices are 4-color printing devices.

7. The method according to claim 2, wherein one of the display devices is a CRT display and another of the display devices is a 4-color printer and wherein there is included in the color printer a color converter for converting RGB color values to YMCK color values.

8. The method according to claim 2, wherein one of the display devices is a CRT display and another of the display devices is a 4-color printer and wherein there is included in the CRT a color converter for converting YMCK color values to RGB color values.

9. Apparatus for generating a transform LUT for converting input color values to output color values, comprising:

(1) digital color image values input means for receiving digital input color image values;

(2) an adder device having (i) a first signal input connected to the input means, (ii) a second, correction error, signal input, and (iii) an output;

(3) a switch circuit having (i) a first signal input connected to the adder device output, (ii) a second control signal input, (iii) a first output, and (iv) a second output;

(4) first and second display model means, each for producing output colorimetric tristimulus image values for input color values, each of said model means having an input and an output, the second model input connected to the first output of the switch circuit;

(5) means, connected to the output of said first and second model means, for comparing the tristimulus values output of the first and second display model means and for producing an error signal;

(6) means for receiving and testing the error signal to determine if said signal is a minimum error signal, and for outputting a correction error signal to the second, correction error, signal input of the adder device and a control signal to the second control signal input of the switch circuit; and (7) means also connected to the input means and the second output of the switch circuit for generating a transform LUT correlating digital input color values to modified color values appearing at the second output of the switch circuit when the means for testing determines that the error signal is a minimum.

10. The apparatus according to claim 9, further comprising means for storing the generated LUT.

11. The apparatus according to claim 9, further comprising a gamut mapping means for mapping output values from the second model into a color gamut commensurate to that of the first model, the gamut mapping means positioned between the output of the second model and the means to compare.

12. The apparatus according to claim 9, further comprising an optimization means in the error testing means for determining if the minimum error is an optimum minimum error.

* * * * *

UNITED STATES PATENT AND TRADEMARK OFFICE
CERTIFICATE OF CORRECTION

PATENT NO. : 5,579,031
DATED : NOVEMBER 26, 1996
INVENTOR(S) : TONY ZHONGJIE LIANG

It is certified that error appears in the above-indentified patent and that said Letters Patent is hereby corrected as shown below:

In the ABSTRACT, line 13: change "A output" to --Output--.

IN THE CLAIMS:

Claim 1, line 1: change "input signals" to --image values--.

Claim 1, line 34: change "obtaining" to --obtained--.

Signed and Sealed this

Sixteenth Day of September, 1997

Attest:

BRUCE LEHMAN

*Attesting Officer*            *Commissioner of Patents and Trademarks*